United States Patent
Nishizu et al.

(10) Patent No.: US 7,707,877 B2
(45) Date of Patent: May 4, 2010

(54) VOLUME MEASURING DEVICE AND METHOD

(75) Inventors: Takahisa Nishizu, Kyoto (JP); Akihiro Nakano, Ibaraki (JP); Yasuo Torikata, Tokyo (JP); Tomoki Yamashita, Tokyo (JP)

(73) Assignees: Kyoto University, Kyoto-Shi (JP); National Institute of Advanced Industrial Science and Technology, Tokyo (JP); Japan Space Forum, Tokyo (JP); Mayekawa Mfg. Co., Ltd., Tokyo (JP)

( * ) Notice: Subject to any disclaimer, the term of this patent is extended or adjusted under 35 U.S.C. 154(b) by 699 days.

(21) Appl. No.: 10/594,088

(22) PCT Filed: Mar. 23, 2005

(86) PCT No.: PCT/JP2005/005272
§ 371 (c)(1),
(2), (4) Date: Feb. 26, 2007

(87) PCT Pub. No.: WO2005/090932
PCT Pub. Date: Sep. 29, 2005

(65) Prior Publication Data
US 2007/0193350 A1    Aug. 23, 2007

(30) Foreign Application Priority Data
Mar. 24, 2004   (JP) .............................. 2004-087589

(51) Int. Cl.
*G01F 17/00*    (2006.01)
(52) U.S. Cl. .......................................................... 73/149
(58) Field of Classification Search .................. 73/149, 73/579
See application file for complete search history.

(56) References Cited

U.S. PATENT DOCUMENTS 3,075,382 A * 1/1963 Mathias ........................ 73/149
3,596,510 A * 8/1971 Paine et al. ................... 73/149
4,561,298 A * 12/1985 Pond ............................ 73/149

(Continued)

FOREIGN PATENT DOCUMENTS

JP          03108614 A  *  5/1991

(Continued)

*Primary Examiner*—John Fitzgerald
(74) *Attorney, Agent, or Firm*—Young & Thompson

(57) ABSTRACT

A volume measuring apparatus is provided with: an acoustic tube whose one end is communicated with a container in which an object to be measured is contained; another container communicated with the other end of the acoustic tube; a partition chamber which defines a sealed space disposed adjacent to the another container and which includes a partition plate for dividing the sealed space and an inner space of the another container; and an electromotive-type speaker which is disposed in the sealed space and whose acoustic wave output surface is disposed opposite to the partition plate. A processing device obtains a volume of the object to be measured, on the basis of an acoustic signal associated with an acoustic wave outputted into the another container via the partition plate from the acoustic wave output surface.

10 Claims, 13 Drawing Sheets

U.S. PATENT DOCUMENTS

| | | | |
|---|---|---|---|
| 4,640,130 A * | 2/1987 | Sheng et al. | 73/579 |
| 4,811,595 A * | 3/1989 | Marciniak et al. | 73/149 |
| 4,991,433 A * | 2/1991 | Warnaka et al. | 73/290 V |
| 5,385,069 A * | 1/1995 | Johnson, Jr. | 73/571 |
| 5,531,111 A * | 7/1996 | Okamoto et al. | 73/149 |
| 5,824,892 A * | 10/1998 | Ishii | 73/149 |

FOREIGN PATENT DOCUMENTS

| | | |
|---|---|---|
| JP | 06-201433 | 7/1994 |
| JP | 06-201434 | 7/1994 |
| JP | 07-083730 | 3/1995 |
| JP | 08-327429 | 12/1996 |

\* cited by examiner

[FIG. 1]
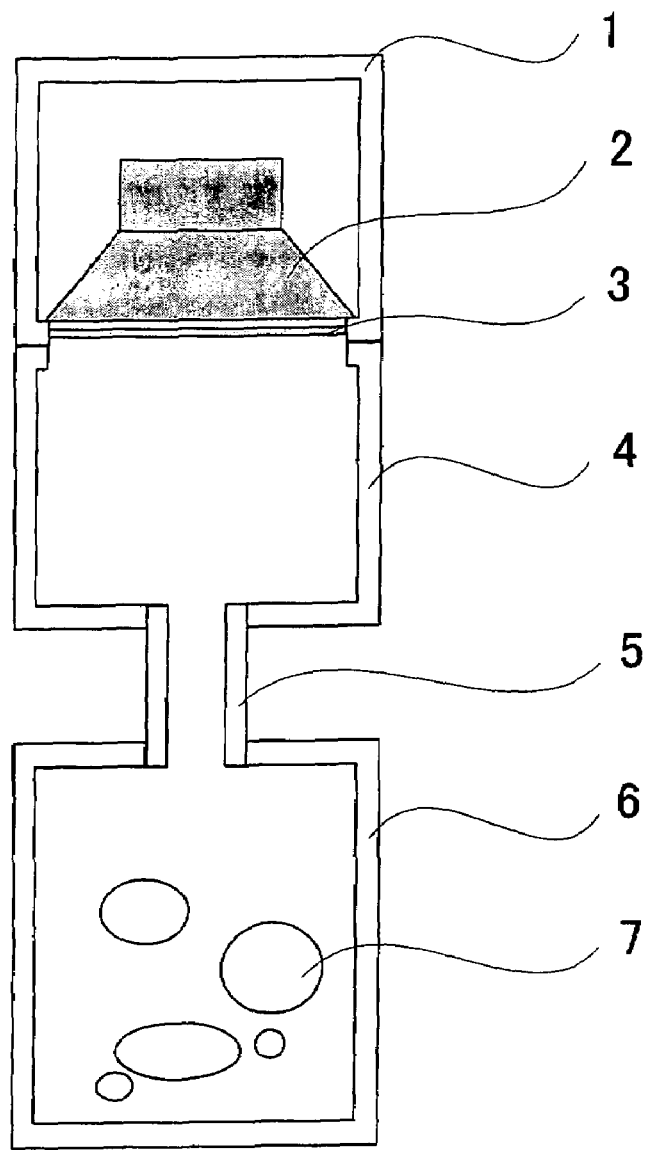

[FIG. 2]
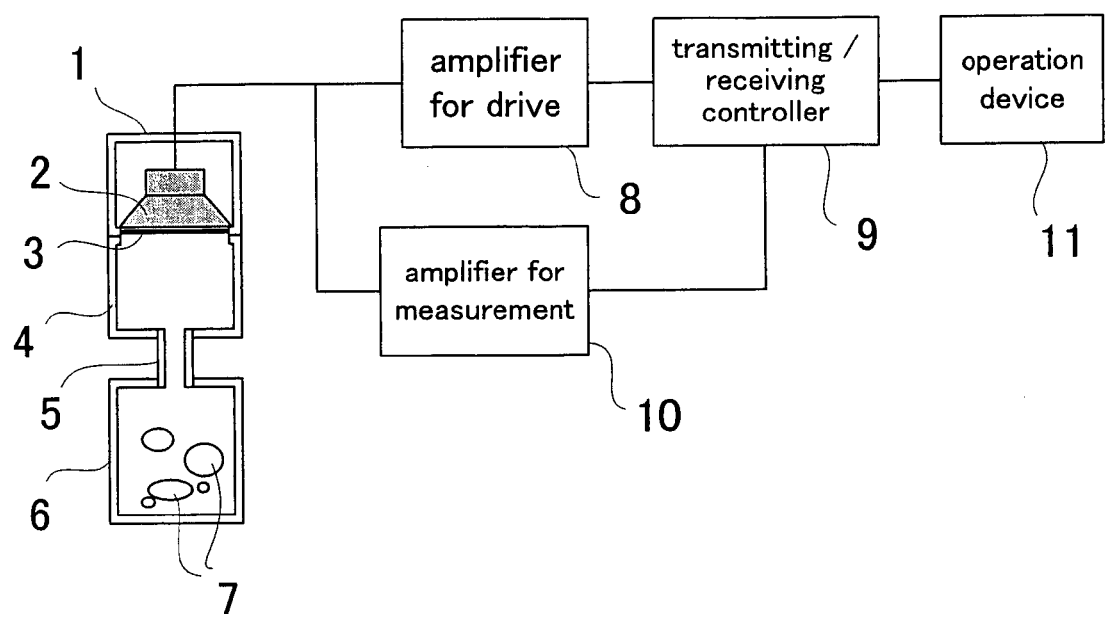

[FIG. 3]
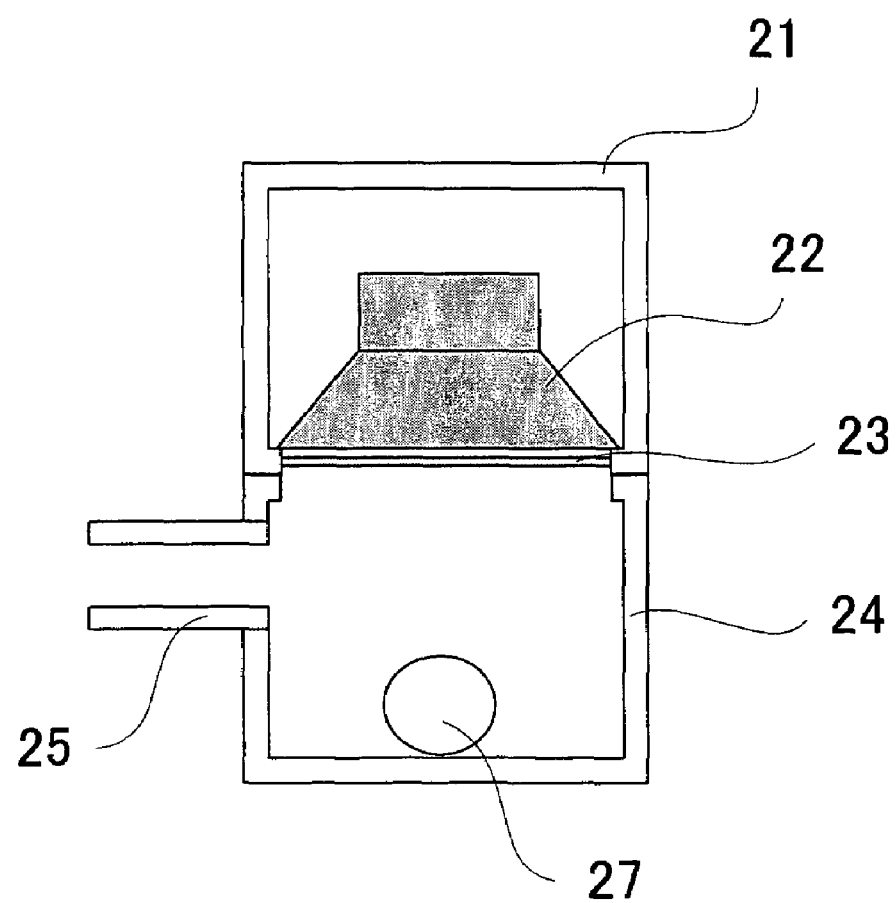

[FIG. 4]
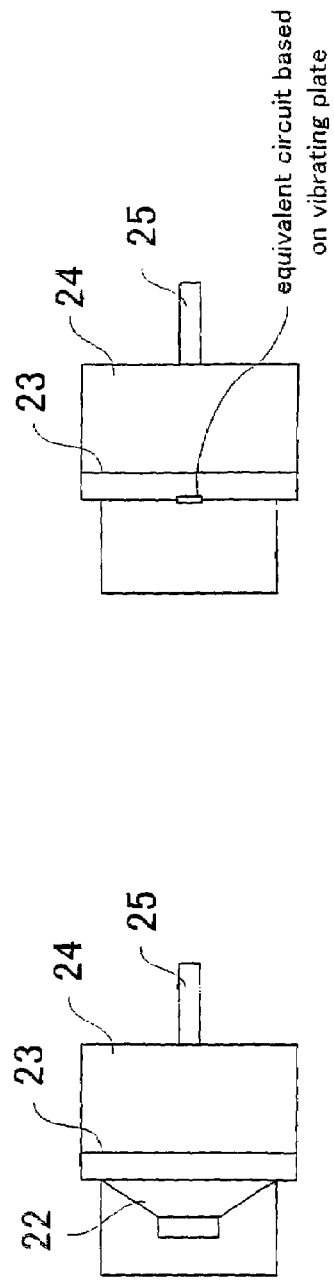
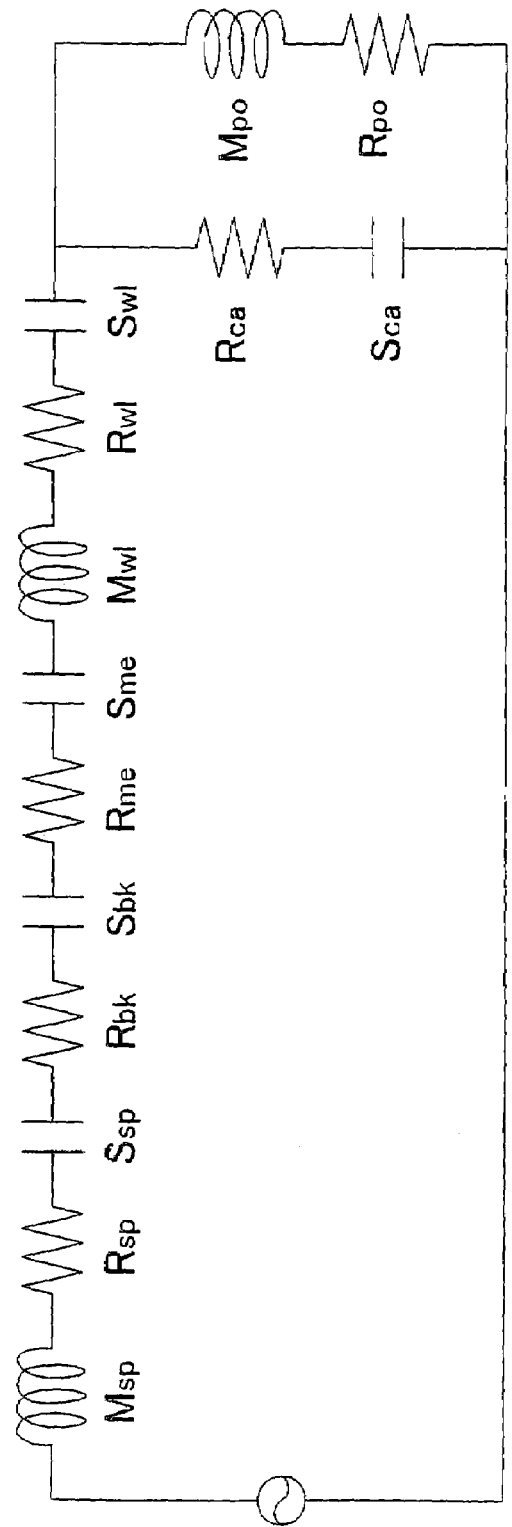

[FIG. 5]
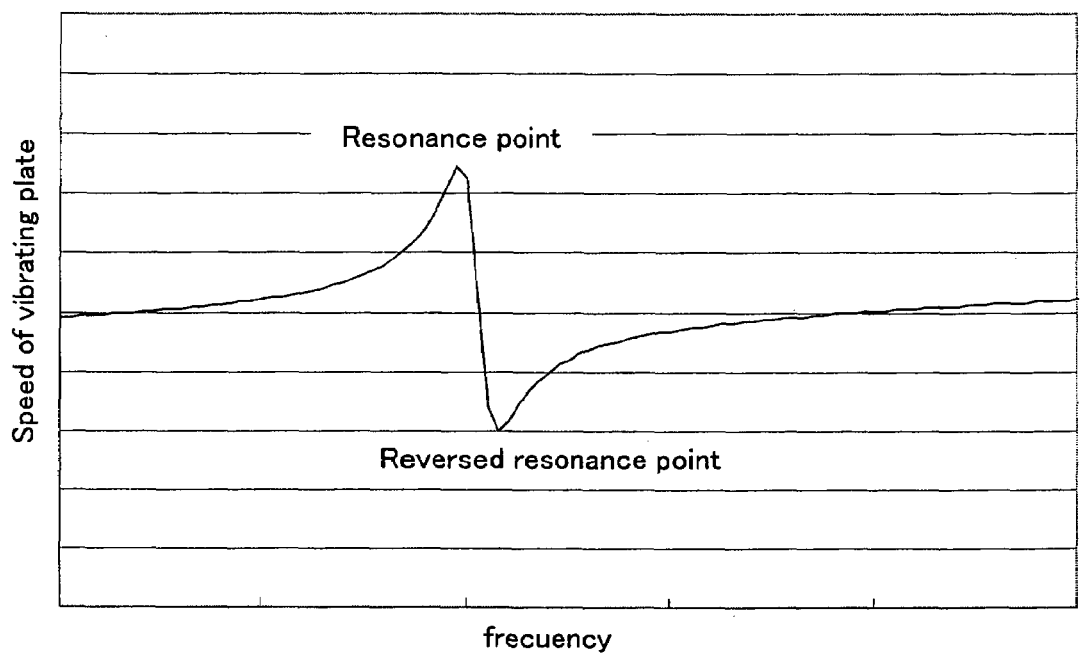

[FIG. 6]
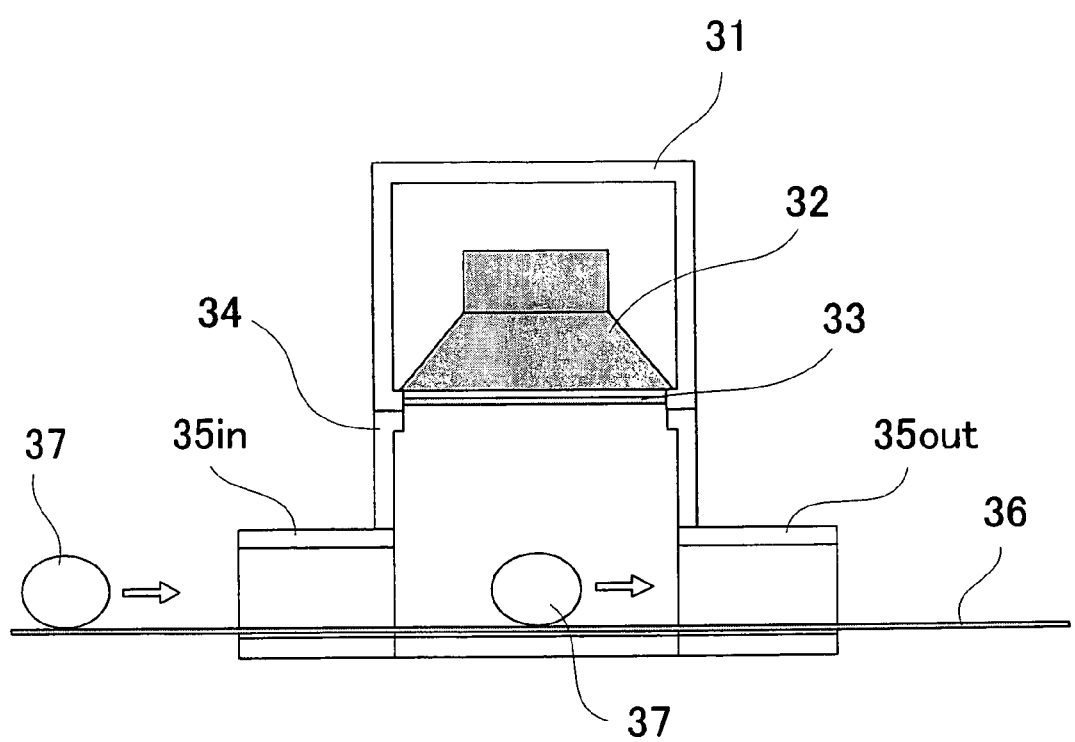

[FIG. 7]
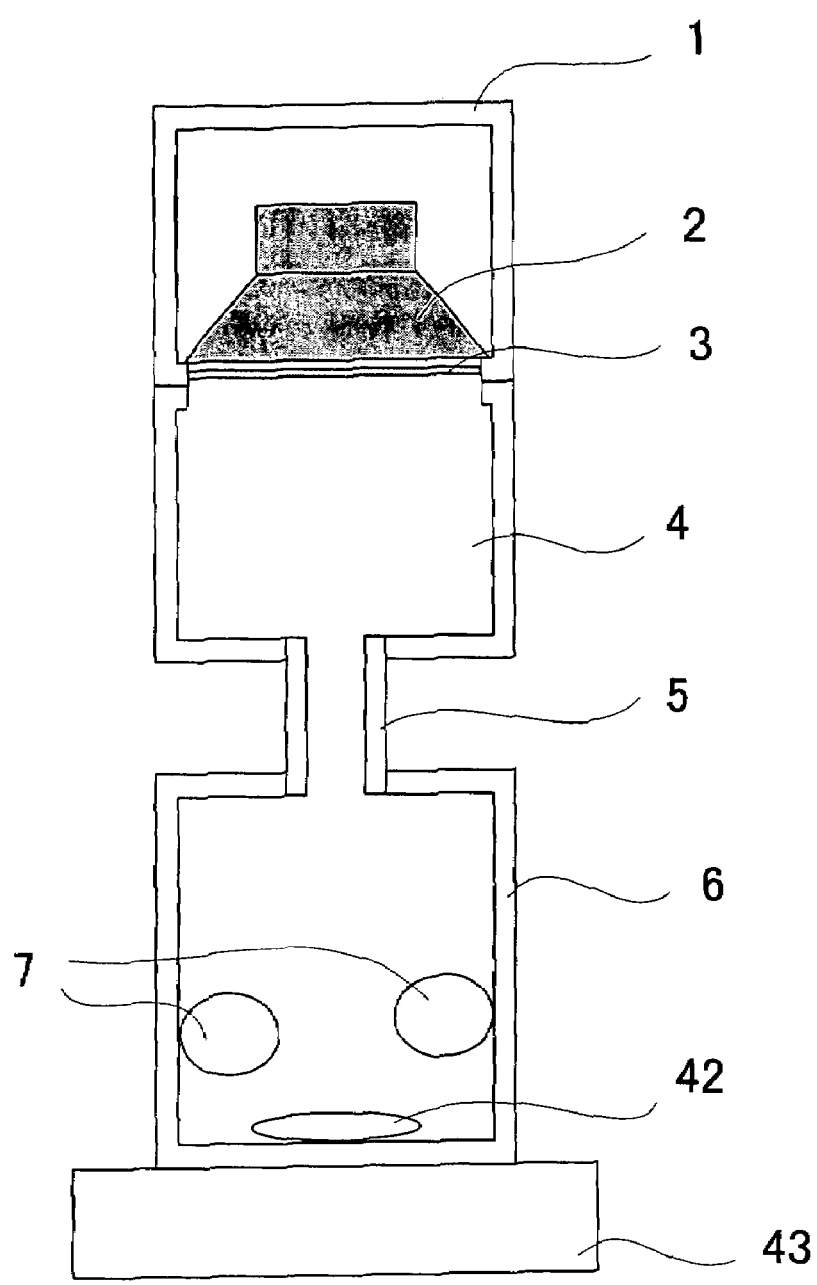

[FIG. 8]
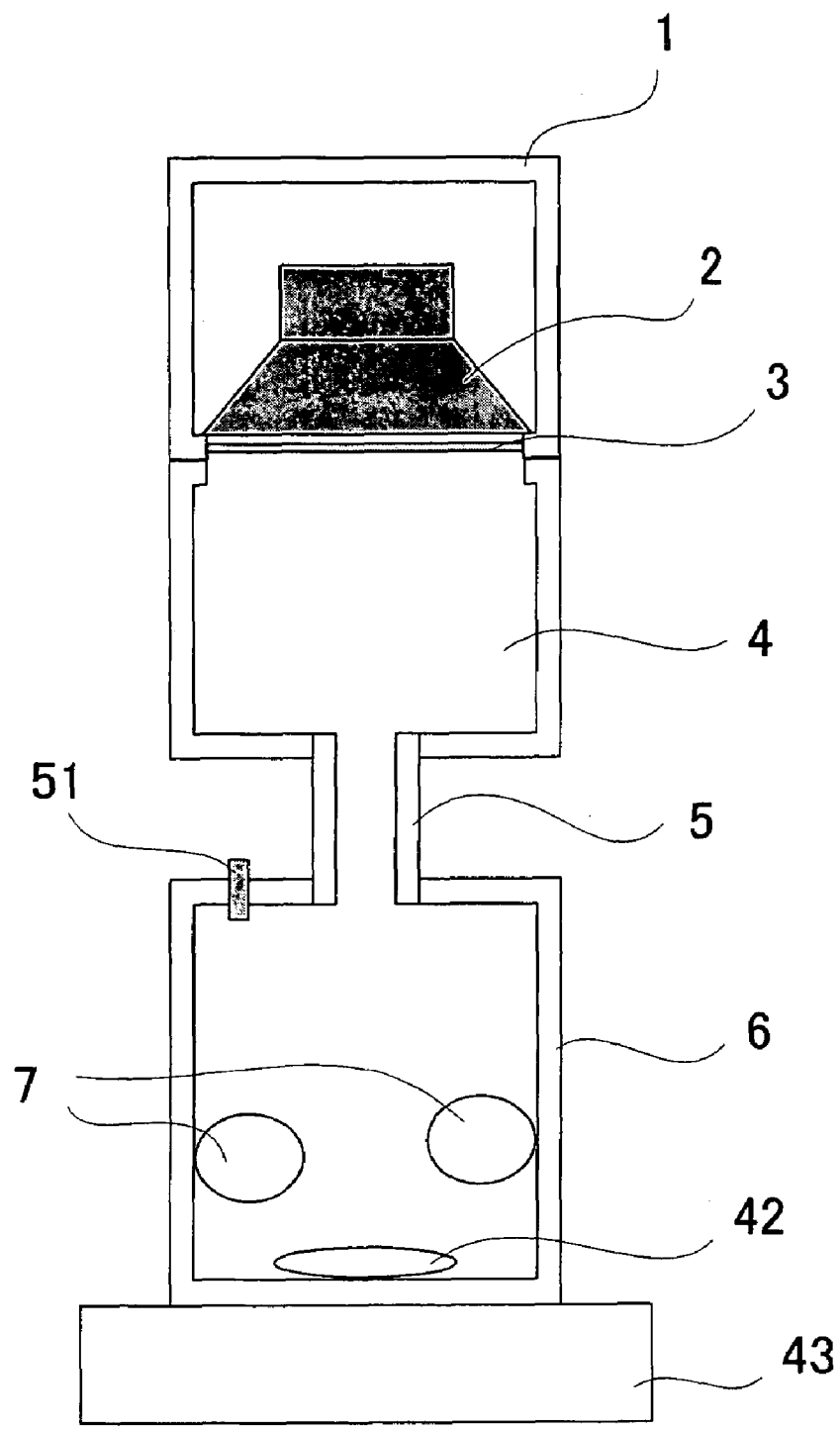

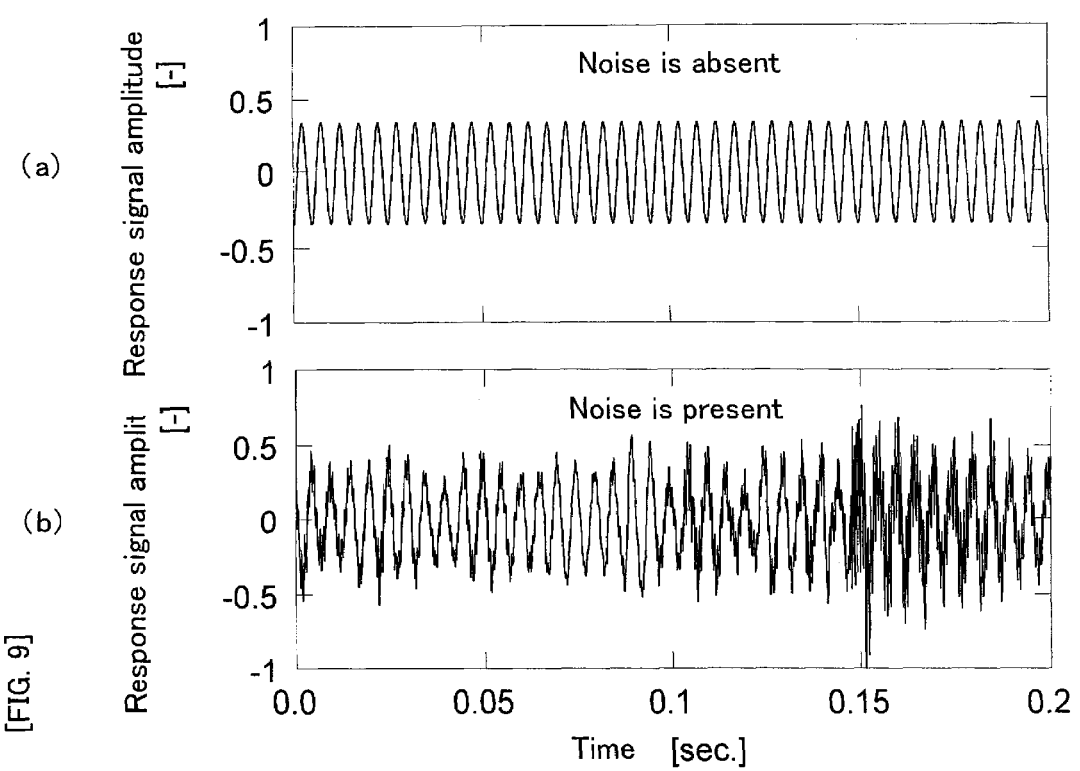
[FIG. 9]

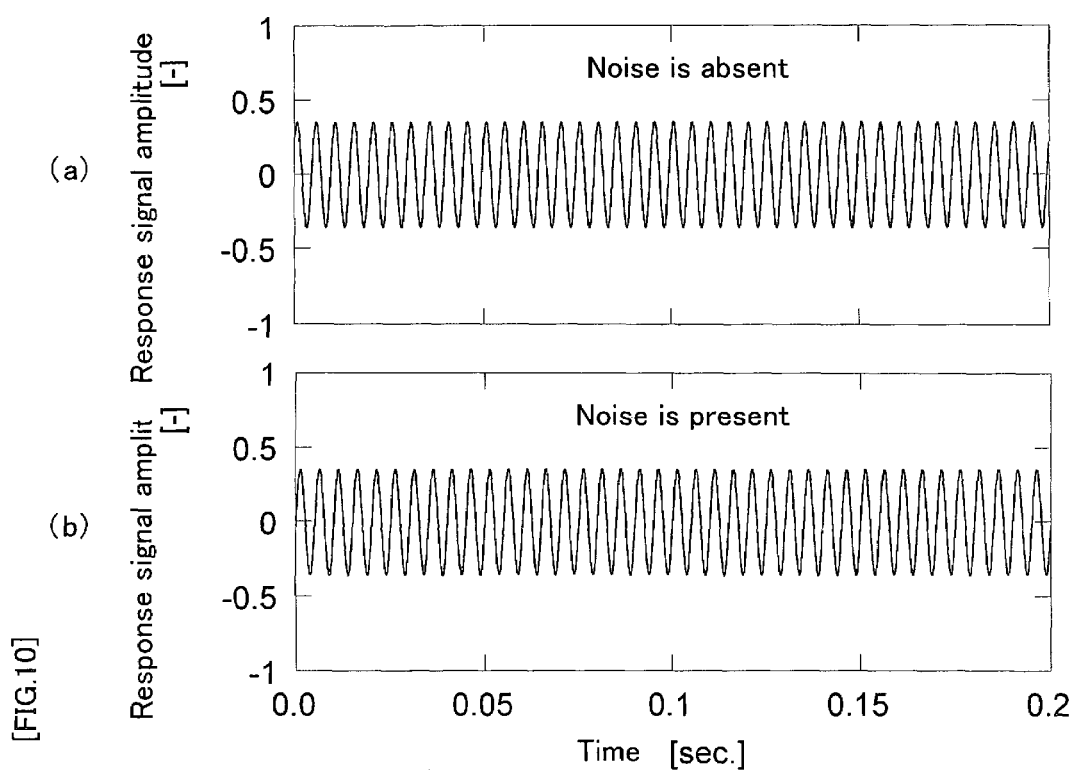
[FIG.10]

[FIG.11]

|  | In case of microphone | | In case of amplifier drived in constant current | |
|---|---|---|---|---|
|  | No noise | With Noise | No noise | With Noise |
| Sample counts | 100 | 100 | 100 | 100 |
| Varivable coefficient | 0.00173 | 0.254 | 0.0238 | 0.0256 |

[FIG.12]
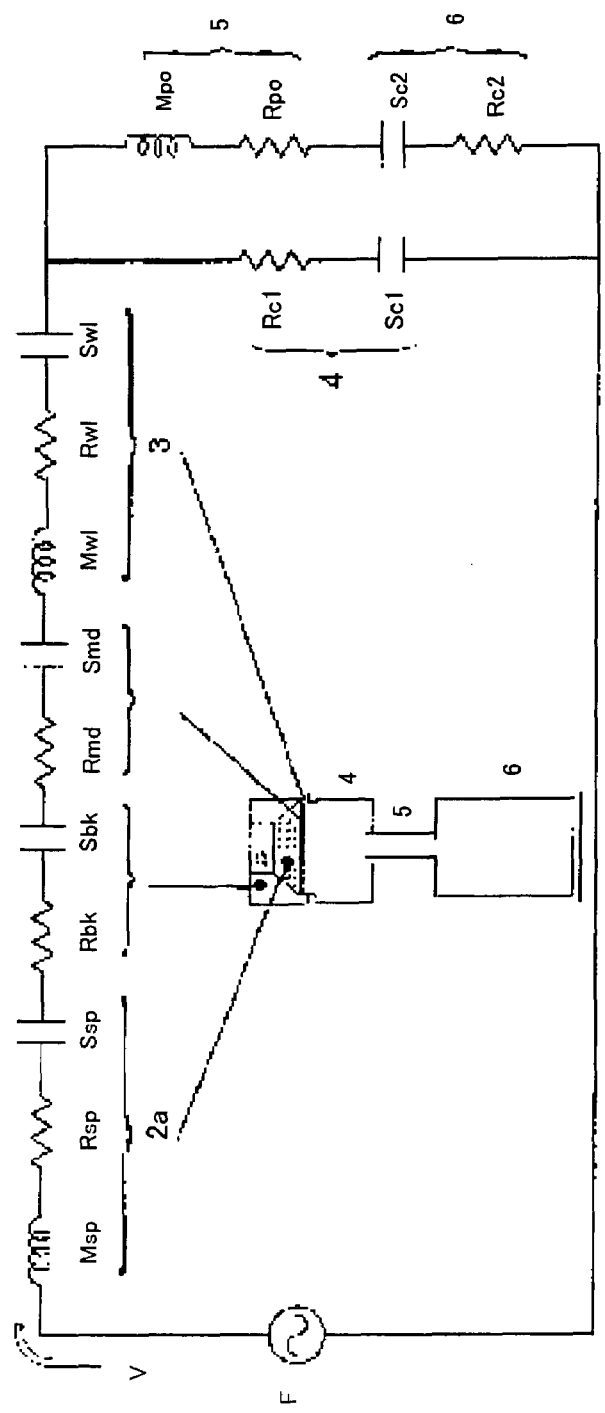

[FIG.13]
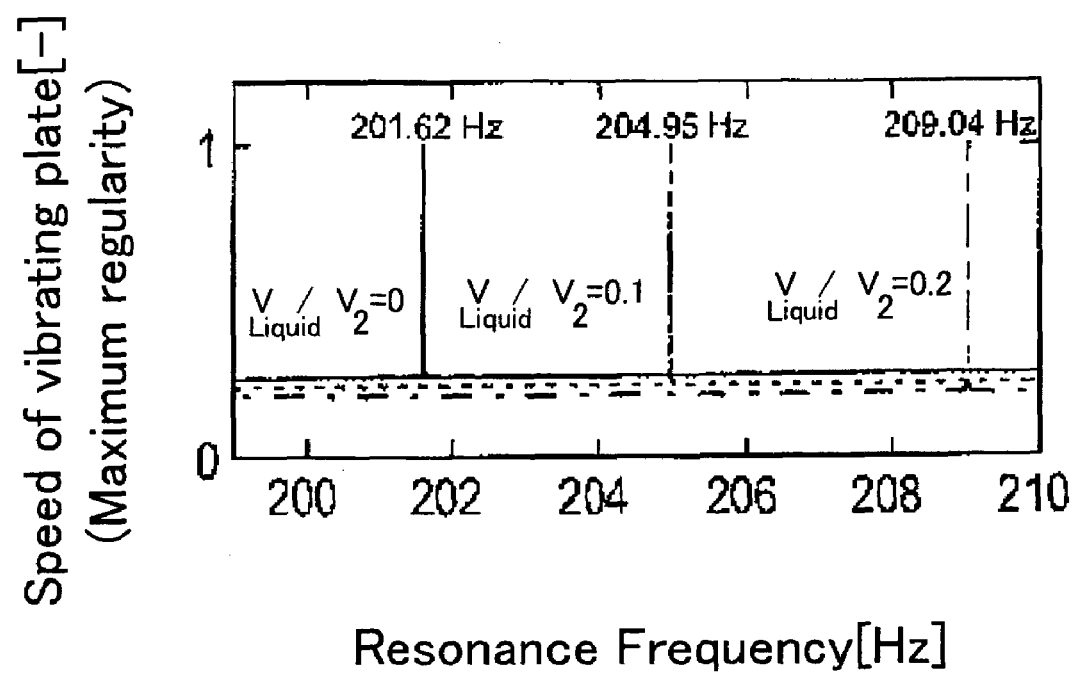

VOLUME MEASURING DEVICE AND METHOD

TECHNICAL FIELD

The present invention relates to (i) a volume measuring apparatus for measuring and (ii) a volume measuring method of measuring a volume of an object in a container in a sealed system (i.e., a closed system) or in a container in an opened system, associated with a space environment technique or a production line for example. In more detail, the present invention relates to the volume measuring apparatus and method, which can be applied for measuring the volume of the object except gas, under the environment (i) in which there is no or minute gravity, (ii) which is vacuum environment such as on an orbit of artificial satellite, or (iii) which is noisy environment such as a production line of product factory for products, for example.

BACKGROUND ART

As the volume measuring apparatus and method of this kind, there are measurements in the Helmholtz type. Among these, the volume measurement in a container in the "opened system" is disclosed in the patent documents 1 and 2, for example. According to these techniques, by (i) disposing an opened acoustic tube in a container, (ii) generating an acoustic sound into the container from a speaker etc., and (iii) picking up the Helmholtz resonance by a microphone, the volume of the liquid is obtained from the resonance frequency.

On the other hand, among these measurements of the Helmholtz type, the volume measurement in a container in the "closed system" is disclosed in the patent document 3 to 5, for example. According to these techniques, by (i) connecting two sealed containers to each other via an acoustic tube, (ii) outputting an acoustic sound into the container or containers from a speaker etc., and (iii) picking up the Helmholtz resonance by a microphone, the volume of the liquid is obtained from the resonance frequency.

The liquid volume measuring apparatus in a tank using a super conduction speaker is disclosed in the patent document 6.

Patent document 1: Japanese Patent Application Laid Open NO. Hei 08-327429

Patent document 2: Japanese Patent Application Laid Open NO. Hei 07-083730

Patent document 3: Japanese Patent Application Laid Open NO. 2003-004503

Patent document 4: Japanese Patent Application Laid Open NO. Hei 06-201433

Patent document 5: Japanese Patent Application Laid Open NO. Hei 06-201434

Patent document 6: Japanese Patent Application Laid Open NO. 2002-291093

DISCLOSURE OF INVENTION

Subject to be Solved by the Invention

However, in such a measuring method that the response of the acoustic signal outputted into the container from the speaker is detected by the microphone disposed in the container as mentioned above, there is a problem that it becomes necessary to discuss a plan for preventing a damage on the microphone, because an object to be measured, such as liquid floating in the container etc., adheres onto the microphone, in the case of non-gravity condition, such as on an orbit of artificial satellite, for example. Alternatively, there is a problem that it becomes impossible or difficult to measure the volume because the object to be measured adheres onto the speaker itself.

It is desirable to reduce the magnitude of sound as little as possible in order to restrain a heat generation from the speaker, in the case that the object to be measured is a combustibility material or an explosive material for example. However, by reducing the magnitude of sound like that, there is a technical problem that an accuracy of the measurement is degraded since the Signal to Noise Ratio of the microphone is reduced due to the external noise other than the acoustic signal.

On the other hand, there is a technical problem that the accuracy of the measurement is also degraded since the Signal to Noise Ratio of the microphone is reduced due to the external noise, when the Helmholtz type measurement of the object is measured, such as liquid under the noisy condition, such as the production line of the production factory.

In order to solve the above-mentioned problem, it is therefore an object of the present invention to provide a volume measuring apparatus and a volume measuring method, which can prevent an element for measurement, such as a speaker or a microphone, for example, from contacting the object to be measured, such as liquid, in the container in the closed or opened system.

Furthermore, it is another object of the present invention to provide a volume measuring apparatus and a volume measuring method, which can measure the volume without requiring an element or elements for measurement, such as a microphone, for example.

Means for Solving the Subject

The above object of the present invention can be achieved by a first volume measuring apparatus, provided with: an acoustic tube whose one end is communicated with a container in which an object to be measured is contained; another container communicated with the other end of said acoustic tube; a partition chamber which defines a sealed space disposed adjacent to said another container and which includes a partition plate for dividing the sealed space and an inner space of said another container; an electromotive-type speaker which is disposed in the sealed space and whose acoustic wave output surface is disposed opposite to the partition plate; and a processing device for obtaining a volume of the object to be measured, on the basis of an acoustic signal associated with an acoustic wave outputted into said another container via the partition plate from the acoustic wave output surface.

According to the first volume measuring apparatus of the present invention, one end of the acoustic tube, such as neck-tube, for example, is communicated with the container in which the object to be measured is contained, such as fluid fuel, for example. The other end of the acoustic tube is communicated with another container. That is to say, it is possible to realize a measurement of the Helmholtz type, because such a constitution is constructed that two containers are communicated with each other, in the closed system. Here, in particular, the partition chamber defines the sealed space disposed adjacent to said another container, and the sealed space and the inner space of said another container are divided by the partition plate. The electromotive-type speaker is disposed in the sealed space. The acoustic wave output surface, which is a front plane of the electromotive-type speaker in general, is disposed opposite to the partition plate.

Upon measuring, the electromotive-type speaker outputs the acoustic wave from the acoustic wave output surface, such as in sweeping a sound in the predetermined frequency range, for example. Then the acoustic wave is outputted into said another container via the partition plate. The processing device obtains a volume of the object to be measured, on the basis of the acoustic signal associated with the acoustic wave, such as in the measurement of the Helmholtz type in the sealed system, for example. In this case, the container in which the object to be measured is contained, the acoustic tube and said another container as described above, are regarded as "container in the sealed system" i.e., closed system, so that it is possible to realize the measurement even in a high vacuum atmosphere such as space outside of earth, for example. Furthermore the electromotive-type speaker hardly contacts or does not contact at all the object to be measured, such as liquid, fluid and viscous object, for example. Owing to this, it is possible to prevent effectively the electromotive-type speaker from damaging or breaking down, eroding, making life time short, being a condition in which it is impossible to perform the measurement, due to the object to be measured. On the other hand, it is possible to prevent effectively the object to be measured from contaminating, for example, the electromotive-type speaker. Furthermore it is possible to construct easily a constitution such that the object to be measured is hardly heated by the electromotive-type speaker because of (i) providing a appropriate heat insulation mean in a side of the sealed space in the partition plate, or (ii) restricting a heat amount generated by outputting of the acoustic wave for a short time period, for example, in such a case that a heat generated from the electromotive-type speaker cannot be transmitted directly to the object to be measured while measurement. So this feature is greatly advantageous in the case that (i) there is possibility of dangerousness, such as explosion based on the nature of the object to be measured when the object to be measured is heated or (ii) it is necessary to consider chemical reaction by adding the heat to the object to be measured.

As a result, according to the first volume measuring apparatus, it is possible to prevent an element for measurement, such as a speaker or a microphone, for example, from contacting one part or all part of the object to be measured, such as liquid. Owing to this feature, it is possible to effectively eliminate a generation of a condition in which the measurement cannot be performed by adhesion of the object to be measured toward the element for measurement, while it is unnecessary to construct a special constitution to prevent the object to be measured, which is in the container placed on an orbit of an artificial satellite, for example, from adhering. Furthermore it is possible to restrict a reduction of Signal to Noise Ratio caused by external noise other than the acoustic signal for measurement. By this it is possible to realize the measurement of the volume in high accuracy, which is hardly or not at all affected by the external noise.

As described above, according to the first volume measuring apparatus, it is possible to realize the measurement of an amount of liquid under a condition in which there is no or minute gravity, which is important in storing or transferring (or transporting) of material for propulsion of the extremely low temperature on the orbit, such as liquid oxygen, liquid hydrogen, liquid methane (liquid natural gas) in space, especially in an orbit around earth or an orbit around a planet, for example. This feature is greatly useful to (i) transfer, store, or re-supply a fuel in the space outside the earth, or (ii) supply the fuel to the OTV (Orbit Transfer Vehicle).

In particular, a measurement method of an amount of liquid, which uses the Helmholtz resonance i.e., a Helmholtz type measurement (a measurement whose type is the Helmholtz type), is preferable. The Helmholtz type measurement (i) is one of volume measuring methods of liquid, solid, fluid, or viscous object, for example, by the acoustic wave using dependency of the volume in frequency, and (ii) has a feature in which the measurement is not affected by a shape of the object to be measured. Incidentally, a change amount of frequency is relatively small, with respect to a change amount of liquid when the amount of liquid is relatively small, in a phenomenon of the Helmholtz resonance.

The above object of the present invention can be achieved by a second volume measuring apparatus, provided with: a container in which an object to be measured is contained; an acoustic tube (i) whose one end is communicated with said container and (ii) whose the other end is open to surrounding atmosphere; a partition chamber which defines a sealed space disposed adjacent to said container and which includes a partition plate for dividing the sealed space and an inner space of said container; an electromotive-type speaker which is disposed in the sealed space and whose acoustic wave output surface is disposed opposite to the partition plate; and a processing device for obtaining a volume of the object to be measured, on the basis of an acoustic signal associated with an acoustic wave outputted into said container via the partition plate from the acoustic wave output surface.

According to the second volume measuring apparatus of the present invention, one end of the acoustic tube, such as neck-tube, for example, is communicated with the container in which the object to be measured is contained, such as fluid and solid, for example. The other end of the acoustic tube is communicated with the surrounding atmosphere. That is to say, it is possible to realize a measurement of the Helmholtz type, because such a constitution is constructed that, in the opened system, one container is the acoustic tube which is communicated with the surrounding atmosphere. Here, in particular, the partition chamber defines the sealed space disposed adjacent to the container. The sealed space and the inner space of the container are divided by the partition plate. The electromotive-type speaker is disposed in the sealed space. The acoustic wave output surface, which is a front plane of cone of the electromotive-type speaker in general, is disposed opposite to the partition plate.

Upon measuring, the electromotive-type speaker outputs the acoustic wave from the acoustic wave output surface. It sweeps a sound in the predetermined frequency range, for example. Then the acoustic wave is outputted into the inner space of the container via the partition plate. The processing device obtains a volume of the object to be measured, on the basis of the acoustic signal associated with the acoustic wave, such as in the measurement of the Helmholtz type in the opened system, for example. In this case, the electromotive-type speaker hardly or not at all contacts the object to be measured, such as liquid and solid, for example. Owing to this, it is possible to prevent effectively the electromotive-type speaker from damaging or breaking down, eroding, making life time short, being a condition in which it is impossible to perform the measurement, due to the object to be measured. On the other hand, it is possible to prevent effectively the object to be measured from contaminating, for example, because of the electromotive-type speaker. Furthermore it is possible to construct easily such a constitution that the object to be measured is hardly heated by the electromotive-type speaker because of (i) providing a appropriate heat insulation mean in a side of the sealed space in the partition plate, or (ii) restraining a heat amount generated by outputting of the acoustic wave for a short time period, for example, in such a case that a heat generated from the electromotive-type speaker cannot be transmitted directly to the object to be measured while measurement.

As a result, according to the second volume measuring apparatus, it is possible to prevent an element for measurement, such as a speaker or a microphone, for example, from contacting one part or all part of the object to be measured, such as liquid. Furthermore it is possible to restrict a reduction of the Signal to Noise Ratio caused by external noise except the acoustic signal for measurement. By this it is possible to realize the measurement of the volume in high accuracy, in which it is hardly or not at all affected by the external noise. As described above, according to the second volume measuring apparatus, it is possible to realize the measurement of an amount of liquid or an amount of solid under a various environment, which is a factory, an inspection place, a research laboratory, and a laboratory for example.

The above object of the present invention can be achieved by a third volume measuring apparatus, provided with: a container in which an object to be measured is contained; a plurality of acoustic tubes (i) whose one ends are respectively communicated with said container and (ii) whose the other ends are respectively open to surrounding environment; a carrying device for carrying the object to be measured into inside of said container via one of said plurality of acoustic tubes and for carrying the object to be measured to outside of said container via the other of said plurality of acoustic tubes; a partition chamber which defines a sealed space disposed adjacent to said container and which includes a partition plate for dividing the sealed space and an inner space of said container; an electromotive-type speaker which is disposed in the sealed space and whose acoustic wave output surface is disposed opposite to the partition plate; and a processing device for obtaining a volume of the object to be measured, on the basis of an acoustic signal associated with an acoustic wave outputted into said container via the partition plate from the acoustic wave output surface.

According to the third volume measuring apparatus of the present invention, one end of the acoustic tube, such as neck-tube, for example, is communicated with the container in which the object to be measured is contained, such as fluid and solid, for example. The other end of the acoustic tube is communicated with the surrounding atmosphere. That is to say, it is possible to realize a measurement of the Helmholtz type, because such a constitution is constructed that, in the opened system, one container is the acoustic tube which is communicated with the surrounding atmosphere. It is constituted such that the object to be measured is carried into the container via one acoustic tube, and the object to be measured is carried out from the container via the other acoustic tube, by a carrying mean, therefore, at least one part of the acoustic tube functions as a pipe or tube for carrying inside and carrying outside. Here, in particular, the partition chamber defines the sealed space disposed adjacent to the container. The sealed space and the inner space of the container are divided by the partition plate. The electromotive-type speaker is disposed in the sealed space. The acoustic wave output surface, which is a front plane of cone of the electromotive-type speaker in general, is disposed opposite to the partition plate.

Upon measuring, the object to be measured is carried into the container via one acoustic tube, by the carrying mean. The electromotive-type speaker outputs the acoustic wave from the acoustic wave output surface. It sweeps a sound in the predetermined frequency range, for example. Then the acoustic wave is outputted into the inner space of the container via the partition plate. The processing device obtains a volume of the object to be measured, on the basis of the acoustic signal associated with the acoustic wave, such as in the measurement of the Helmholtz type in the opened system, for example. In this case, the electromotive-type speaker hardly or not at all contacts the object to be measured, such as liquid and solid, for example. Owing to this, it is possible to prevent effectively the electromotive-type speaker from damaging or breaking down, eroding, making life time short, being a condition in which it is impossible to perform the measurement, due to the object to be measured. On the other hand, it is possible to prevent effectively the object to be measured from contaminating, for example, because of the electromotive-type speaker. Furthermore it is possible to construct easily such a constitution that the object to be measured is hardly heated by the electromotive-type speaker because of (i) providing a appropriate heat insulation mean in a side of the sealed space in the partition plate, or (ii) restraining a heat amount generated by outputting of the acoustic wave for a short time period, for example, in such a case that a heat generated from the electromotive-type speaker cannot be transmitted directly to the object to be measured while measurement. After the measurement time, the object to be measured is carried out from the container via the other acoustic tube, by the carrying mean. After this, the measurement of the volume is preferably performed in an assembly-line system by carrying the next object to be measured into the container.

As a result, according to the third volume measuring apparatus, it is possible to prevent an element for measurement, such as a speaker or a microphone, for example, from contacting one part or all part of the object to be measured, such as liquid. Furthermore it is possible to restrict a reduction of Signal to Noise Ratio caused by external noise except the acoustic signal for measurement. By this it is possible to realize the measurement of the volume in high accuracy, in which it is hardly or not at all affected by the external noise. As described above, according to the third volume measuring apparatus, it is possible to realize the measurement of an amount of liquid or an amount of solid under a various environment, which is a factory, an inspection place, a research laboratory, and a laboratory for example.

In one aspect of the first to third volume measuring apparatus of the present invention, the volume measuring apparatus further comprising: an amplifier, whose type is constant current driving type, for driving said electromotive-type speaker, wherein said processing device includes (i) a measuring device for measuring a voltage of a voice coil associated with said electromotive-type speaker and (ii) a calculating device for calculating the volume of the object to be measured, on the basis of the measured voltage.

According to this aspect, the voltage of the voice coil associated with the electromotive-type speaker is measured by the measuring device, while the amplifier drives the electromotive-type speaker in the constant current condition. It is possible to calculate the volume of the object to be measured, on the based on the voltage of the voice coil, because the voltage of the voice coil is generally in proportion to an impedance of the voice coil. That is to say, it is possible to indirectly obtain the "acoustic signal associated with an acoustic wave outputted into the sealed space", on the basis of the voltage of the voice coil which is generally in proportion to an impedance of the voice coil, as the acoustic signal used for measurement. Therefore it is possible to specify (or specify for choosing) the Helmholtz resonance frequency in the gaseous phase part in the container. Described above, there is no need to set a microphone in the container. If the microphone is set in the container, there is a possibility to reduce the Signal to Noise Ratio because of a result caused overlapping the external noise on the acoustic signal. On the contrary, owing to the measurement without using the microphone, this feature is greatly advantageous in the point of view for improving in measurement accuracy. In another word, the measurement without using the microphone is hardly or not at all affected by influence of external noise, as compared with the measurement using the microphone. This is because a loss caused by changing via the partition plate is greater than the effect of the microphone, in a part where the noise, such as the external noise other than the acoustic signal, is changed in the mechanical system of the electromotive-type speaker. More specifically, this is because a loss in the changing part where the noise, such as the external noise other than the acoustic signal, is changed into the mechanical system of the electromotive-type speaker, is greater in the measurement without using the microphone than in the measurement using the microphone.

In this aspect, at further, the calculating device may include (i) a first calculating device for performing a frequency analysis associated with the acoustic signal, on the basis of the measured voltage and (ii) a second calculating device for calculating the volume of the object to be measured, on the basis of result of the performed frequency analysis.

By virtue of such a construction, the frequency analysis, such as the FFT method (Fast Fourier Transform Method) or the MEM (Maximum Entropy Method), for example, is performed by the first calculating device. In particular, it is possible to obtain the Helmholtz resonance frequency on the basis of the acoustic data for a short time period, by using MEM. Incidentally, for performing the measurement of the volume in specifying accurate sound speed in the container, that is to say, for accurately measuring a volume of a gaseous phase part, it is preferable to firstly understand a distribution of temperature and to secondly correct the volume of a gaseous phase part on the basis of the distribution of temperature.

In this aspect, at further, the first calculating device may determine a resonance frequency associated with the acoustic signal, as a frequency providing peak in spectrum of the measured voltage, and the second calculating device may calculate the volume, on the basis of the determined resonance frequency.

By virtue of such construction, it is possible to determine (or determine for choosing) the resonance frequency on the basis of a value in peak of the voltage of the voice coil, after measuring the voltage of the voice coil which is generally in proportion to an impedance of the voice coil in the peak, instead of measuring the impedance of the voice coil, that is to say, as a peak of frequency i.e., a peak frequency of voltage spectrum, in voltage spectrum measured, by the first calculating device. Furthermore, the volume is calculated on the basis of the resonance frequency determined by the second calculating device. Therefore it is possible to obtain the volume for a relatively short time period and in a high accuracy in the Helmholtz type measurement related to the closed system and the opened system.

In this aspect, at further, said container may contain the object to be measured in an extremely low temperature condition, an amplifier may drive the electromotive-type speaker in the constant current condition so as to perform the maximum entropy method (MEM) for a sufficient time period, and the first calculating device may determine the resonance frequency by the maximum entropy method.

By virtue of such construction, it is possible to determine the resonance frequency on the basis of the MEM (Maximum Entropy Method), for the object to be measured which is contained in the container in an extremely low temperature condition, such as liquid fuel, for example. Furthermore, the volume is calculated on the basis of the resonance frequency determined as described above. In particular, by using the MEM, it is possible to obtain the resonance frequency on the basis of an acoustic data for a very short time period, such as from dozens of millisecond to hundreds of millisecond, for example. On the other hand, for the FFT method, an acoustic data for a relatively long time period, such as from five seconds to ten seconds is used. Therefore, using the MEM is advantageous in the case to treat an extremely low temperature fluid which is not permitted to be high temperature or which is not preferable to be high temperature, in considering that the electromotive-type speaker generates a heat as a heat body at operating.

Incidentally, it is possible to measure the volume on the basis of a reversed resonance frequency, after specifying (or specifying for choosing) the reversed resonance frequency on an impedance curve associated with the voice coil of the electromotive-type speaker, while driving the electromotive-type speaker not in the constant current condition but in the constant voltage condition.

In another aspect of the first to third volume measuring apparatus of the present invention, the volume measuring apparatus further comprises: a microphone for receiving the acoustic wave, wherein said processing device obtains a volume of the object to be measured, on the basis of the acoustic signal associated with an acoustic wave received by said microphone.

According to this aspect, upon measuring, the electromotive-type speaker outputs the acoustic wave from the acoustic wave output surface, then the acoustic wave is outputted into said another container via the partition plate. Then, the acoustic wave is received by the microphone placed at the predetermined position, such as the inside of the container in which the object to be measured is contained. Then it is possible to obtain the volume in the Helmholtz type measurement, for example, on the basis of the acoustic signal associated with the acoustic wave received. Owing to this feature, it is possible to prevent the electromotive-type speaker from contacting the object to be measured, such as liquid, even if using the microphone. So damaging or the like in contacting will not happen.

Incidentally, a constitution for combination of a detection of the acoustic signal by the microphone and a detection of the acoustic signal by the impedance measurement of the voice coil described above is also preferable.

The above object of the present invention can be achieved by a forth volume measuring apparatus, provided with: an acoustic tube whose one end is communicated with a container in which an object to be measured is contained; another container communicated with the other end of said acoustic tube; an electromotive-type speaker whose acoustic wave output surface is disposed facing an inner space of said another container; an amplifier, whose type is constant current driving type, for driving said electromotive-type speaker; a measuring device for measuring a voltage of a voice coil associated with said electromotive-type speaker; and a calculating device for calculating a volume of the object to be measured, on the basis of the measured voltage.

According to the forth volume measuring apparatus of the present invention, the volume of the object to be measured can be calculated, by the calculating device, in measuring the voltage of the voice coil associated with the electromotive-type speaker by the measuring device, while the electromotive-type speaker is driven in the constant current condition by the amplifier. Therefore, there is no need to set a microphone for obtaining the acoustic signal associated with the acoustic wave outputted from the electromotive-type speaker.

The above object of the present invention can be achieved by a fifth volume measuring apparatus, provided with: a container in which an object to be measured is contained; an acoustic tube (i) whose one end is communicated with said container and (ii) whose the other end is open to surrounding environment; an electromotive-type speaker whose acoustic wave output surface is disposed facing an inner space of said container; an amplifier, whose type is constant current actuating type, for driving said electromotive-type speaker; a measuring device for measuring a voltage of a voice coil associated with said electromotive-type speaker; and a calculating device for calculating a volume of the object to be measured, on the basis of the measured voltage.

According to the fifth volume measuring apparatus of the present invention, the volume of the object to be measured can be calculated, by the calculating device, in measuring the voltage of the voice coil associated with the electromotive-type speaker by the measuring device, while the electromotive-type speaker is driven in the constant current condition by an amplifier. Therefore, there is no need to set a microphone for obtaining the acoustic signal associated with the acoustic wave outputted from the electromotive-type speaker.

The above object of the present invention can be achieved by a sixth volume measuring apparatus, provided with: a container in which an object to be measured is contained; a plurality of acoustic tubes (i) whose one ends are respectively communicated with said container and (ii) whose the other ends are respectively open to surrounding environment; a carrying device for carrying the object to be measured into inside of said container via one of said plurality of acoustic tubes and for carrying the object to be measured to outside of said container via the other of said plurality of acoustic tubes; an electromotive-type speaker whose acoustic wave output surface is disposed facing an inner space of said container; an amplifier, whose type is constant current actuating type, for driving said electromotive-type speaker; a measuring device for measuring a voltage of a voice coil associated with said electromotive-type speaker; and a calculating device for calculating a volume of the object to be measured, on the basis of the measured voltage.

According to the sixth volume measuring apparatus of the present invention, the volume of the object to be measured can be calculated, by the calculating device, in measuring the voltage of the voice coil associated with the electromotive-type speaker by the measuring device, while the electromotive-type speaker is driven in the constant current condition by an amplifier. Therefore, there is no need to set a microphone for obtaining the acoustic signal associated with the acoustic wave outputted from the electromotive-type speaker.

In another aspect of the first to sixth volume measuring apparatus of the present invention, the object to be measured may be fluid, and said volume measuring apparatus may further comprise: a separating device for separating the fluid from gaseous phase in a non or minute gravity condition.

According to this aspect, the object to be measured, such as a liquid, is separated from the gaseous phase part in the container by the separating device, such that (i) a static separating device e.g., groove, mesh, steal wool, sponge and wick, or (ii) a dynamic separating device e.g., a rotation element and a mixer, for example, in the container which condition is in such that there is no or minute gravity i.e., micro gravity (in other word). Therefore, it is possible to perform the Helmholtz type measurement even in such a condition that there is no or minute gravity, such as in the space outside of the earth.

Of course, as described above, according to the first to sixth volume measuring apparatus of the present invention, it is possible to measure the volume of "solid" as the object to be measured.

The above object of the present invention can be also achieved by a first volume measuring method in a first volume measuring apparatus provided with an acoustic tube whose one end is communicated with a container in which an object to be measured is contained; another container communicated with the other end of said acoustic tube; a partition chamber which defines a sealed space disposed adjacent to said another container and which includes a partition plate for dividing the sealed space and an inner space of said another container; and an electromotive-type speaker which is disposed in the sealed space and whose acoustic wave output surface is disposed opposite to the partition plate, said volume measuring method comprising: an outputting process of outputting an acoustic wave into said another container via the partition plate from the acoustic wave output surface; and a processing process of obtaining a volume of the object to be measured, on the basis of an acoustic signal associated with the outputted acoustic wave.

According to the first volume measuring method of the present invention, it is possible to receive the various benefits owned by the above-mentioned the first volume measuring apparatus of the present invention. It is possible to measure the volume of the object to be measured in the non or minute gravity condition, by the Helmholtz type measurement, in the closed system, for example, in a relatively easy way and precisely.

The above object of the present invention can be also achieved by a second volume measuring method in a second volume measuring apparatus provided with a container in which an object to be measured is contained; an acoustic tube (i) whose one end is communicated with said container and (ii) whose the other end is open to surrounding atmosphere; a partition chamber which defines a sealed space disposed adjacent to said container and which includes a partition plate for dividing the sealed space and an inner space of said container; an electromotive-type speaker which is disposed in the sealed space and whose acoustic wave output surface is disposed opposite to the partition plate, said volume measuring method comprising: an outputting process of outputting an acoustic wave into said container via the partition plate from the acoustic wave output surface; and a processing process of obtaining a volume of the object to be measured, on the basis of an acoustic signal associated with the outputted acoustic wave.

According to the second volume measuring method of the present invention, it is possible to receive the various benefits owned by the above-mentioned the second volume measuring apparatus of the present invention. It is possible to measure the volume of the liquid or the solid in various environments, such as a factory, an inspection place, a research laboratory and laboratory, by the Helmholtz type measurement, in the opened system, for example, in a relatively easy way and precisely.

The above object of the present invention can be also achieved by a third volume measuring method in a third volume measuring apparatus provided with a container in which an object to be measured is contained; a plurality of acoustic tubes (i) whose one ends are respectively communicated with said container and (ii) whose the other ends are respectively open to surrounding environment; a carrying device for carrying the object to be measured into inside of said container via one of said plurality of acoustic tubes and for carrying the object to be measured to outside of said container via the other of said plurality of acoustic tubes; a partition chamber which defines a sealed space disposed adjacent to said container and which includes a partition plate for dividing the sealed space and an inner space of said container; and an electromotive-type speaker which is disposed in the sealed space and whose acoustic wave output surface is disposed opposite to the partition plate, said volume measuring method comprising: an outputting process of outputting an acoustic wave into said container via the partition plate from the acoustic wave output surface; and a processing process of obtaining a volume of the object to be measured, on the basis of an acoustic signal associated with the outputted acoustic wave.

According to the third volume measuring method of the present invention, it is possible to receive the various benefits owned by the above-mentioned the third volume measuring apparatus of the present invention. It is possible to measure the volume of the liquid or the solid in various environments, such as a factory, an inspection place, a research laboratory and laboratory, by the Helmholtz type measurement, in the opened system, for example, in a relatively easy way and precisely.

Incidentally, even the first to third volume measuring method of the present invention can adopt the same aspects as the various aspects of the above-mentioned the first to third volume measuring apparatus of the present invention, as occasion demands. Furthermore, it is preferable to specify the Helmholtz resonance frequency based on the result of the measurement after measuring the voltage of the voice coil while driving the electromotive-type speaker in the constant current condition. Alternatively, it is preferable to specify the reversed resonance frequency based on the result of the measurement after measuring the voltage of the voice coil while driving the electromotive-type speaker in the constant voltage condition. In both cases, it is possible to perform the Helmholtz type measurement.

The above object of the present invention can be also achieved by a fourth volume measuring method provided with an acoustic tube whose one end is communicated with a container in which an object to be measured is contained; another container communicated with the other end of said acoustic tube; an electromotive-type speaker whose acoustic wave output surface is disposed facing an inner space of said another container; and an amplifier, whose type is constant current driving type, for driving said electromotive-type speaker, said volume measuring method comprising: a measuring process of measuring a voltage of a voice coil associated with said electromotive-type speaker; and a calculating process of calculating a volume of the object to be measured, on the basis of the measured voltage.

According to the fourth volume measuring method of the present invention, it is possible to receive the various benefits owned by the above-mentioned the fourth volume measuring apparatus of the present invention. It is possible to omit to set the microphone same as the fourth volume measuring apparatus described above.

The above object of the present invention can be also achieved by a fifth volume measuring method in a fifth volume measuring apparatus provided with an acoustic tube whose one end is communicated with a container in which an object to be measured is contained; another container communicated with the other end of said acoustic tube; an electromotive-type speaker whose acoustic wave output surface is disposed facing an inner space of said another container; and an amplifier, whose type is constant current driving type, for driving said electromotive-type speaker, said volume measuring method comprising: a measuring process of measuring a voltage of a voice coil associated with said electromotive-type speaker; and a calculating process of calculating a volume of the object to be measured, on the basis of the measured voltage.

According to the fifth volume measuring method of the present invention, it is possible to receive the various benefits owned by the above-mentioned the fifth volume measuring apparatus of the present invention. It is possible to omit to set the microphone same as the fifth volume measuring apparatus described above.

The above object of the present invention can be also achieved by a sixth volume measuring method in a sixth volume measuring apparatus provided with a container in which an object to be measured is contained; an acoustic tube (i) whose one end is communicated with said container and (ii) whose the other end is open to surrounding environment; an electromotive-type speaker whose acoustic wave output surface is disposed facing an inner space of said container; and an amplifier, whose type is constant current actuating type, for driving said electromotive-type speaker, said volume measuring method comprising: a measuring process of measuring a voltage of a voice coil associated with said electromotive-type speaker; and a calculating process of calculating a volume of the object to be measured, on the basis of the measured voltage.

According to the sixth volume measuring method of the present invention, it is possible to receive the various benefits owned by the above-mentioned the sixth volume measuring apparatus of the present invention. It is possible to omit to set the microphone same as the sixth volume measuring apparatus described above.

Incidentally, even the fourth to sixth volume measuring method of the present invention can adopt the same aspects as the various aspects of the above-mentioned the fourth to sixth volume measuring apparatus of the present invention, as occasion demands.

These effects and other advantages of the present invention will become more apparent from the following embodiments.

BRIEF DESCRIPTION OF DRAWINGS

FIG. 1 is a schematic sectional view showing a structure of a resonator part included in the volume measuring apparatus associated with the first embodiment.

FIG. 2 is a block diagram showing a constitution of all parts of the volume measuring apparatus which includes a part for the measurement other than the resonator part, in the volume measuring apparatus associated with the first embodiment.

FIG. 3 is a schematic sectional view showing a structure of a resonator part included in the volume measuring apparatus associated with the second embodiment.

FIG. 4 is an equivalent circuit diagram showing an electrical equivalent circuit from a view point of a vibrating plate, in an acoustic system, associated with the second embodiment.

FIG. 5 is a characteristic diagram showing a relationship between a frequency of the acoustic signal and a speed of the vibrating plate in the electromotive-type speaker associated with the second embodiment.

FIG. 6 is a schematic sectional view showing a structure of the resonator part included in the volume measuring apparatus associated with the third embodiment.

FIG. 7 is a schematic sectional view showing a structure of the resonator part included in the volume measuring apparatus associated with the fourth embodiment.

FIG. 8 is a schematic sectional view showing a structure of the resonator part included in the volume measuring apparatus associated with the fifth embodiment.

FIG. 9 is a signal waveform diagram showing the result of noise experiment associated with the fifth embodiment.

FIG. 10 is a signal waveform diagram showing the result of noise experiment associated with the fourth embodiment.

FIG. 11 is a table showing a variable coefficient of the resonance frequency specified (or specified for choosing) when the Helmholtz resonance frequency is measured by one hundred times under the same condition.

FIG. 12 is a circuit diagram showing an electrical estimation circuit obtained by replacing (i) the vibration in the machinery system or the mechanical system and the acoustic system from a view point of the speaker cone (i.e., vibrating plate), with (ii) the vibration in the machinery system, on an assumption that a wave length, which is lager than the size of the resonator in resonance, can be approximately equal to a concentration constant system.

FIG. 13 is a characteristic diagram showing a frequency characteristic of the speed of the vibration plate, in the case that fluid is putted in the second container by 0%, 10% and 20% respectively for the capacity of the second container.

DESCRIPTION OF REFERENCE CODES 1, 21, 31 . . . partition chamber, 2, 22, 32 . . . electromotive-type speaker, 3, 23, 33 . . . partition plate, 4 . . . first container, 5, 25, 35in, 35out . . . acoustic tube, 6 . . . second container, 7, 27 . . . liquid sample, 8 amplifier for derive, 9 . . . transmitting and receiving controller, 10 . . . amplifier for measurement, 11 . . . operation device (operator), 36 . . . carrying belt, 37 . . . solid sample, 42 . . . mixer or stirrer bar, 43 . . . magnetic stirrer, 2a . . . speaker cone (vibration plate)

BEST MODE FOR CARRYING OUT THE INVENTION

Hereinafter, the best mode for carrying out the present invention will be explained, with reference to the drawings.

First Embodiment

Next, with reference to FIG. 1 and FIG. 2, a first embodiment of the volume measuring apparatus of the present invention will be discussed. FIG. 1 shows an outline of a structure of a resonator part included in the volume measuring apparatus associated with the first embodiment. FIG. 2 shows a block constitution of all parts of the volume measuring apparatus which includes the part for the measurement other than the resonator part shown in FIG. 1, in the volume measuring apparatus associated with the first embodiment. The volume measuring apparatus associated with the first embodiment is (i) the embodiment of "the first volume measuring apparatus" associated with the present prevention and (ii) a measurement apparatus whose type is the Helmholtz type in the closed system.

At first, the structure of the first embodiment will be discussed in detail.

As shown in FIG. 1, the volume measuring apparatus is provided with: a partition chamber 1; an electromotive-type speaker 2; a first container 4; a neck-tube 5; and a second container 6, as the resonator part. In this case, the partition chamber 1 defines the sealed space at the inside thereof. The electromotive-type speaker 2 is disposed in the sealed space. The partition chamber 1 includes a partition plate 3. The acoustic wave output surface of the electromotive-type speaker 2 (which is a front plane placed at the lower side in FIG. 1) is disposed opposite to the partition plate 3. The space between the electromotive-type speaker 2 and the partition plate 3 is preferably sealed. The volume of this space is preferably small enough as compared with the volume of the second container 6.

The first container 4 is one example of "another container" associated with the first volume measuring apparatus of the present prevention. The partition chamber 1 is disposed adjacent to the first container 4. The second container 6 is one example of "container" associated with the first volume measuring apparatus of the present prevention. A liquid sample 7, which is one example of "object to be measured" associated with the present prevention, is contained in the second container 6. The neck-tube 5 is one example of "acoustic tube" associated with the present prevention, is for communication between the first container 4 and the second container 6, and constitutes a Helmholtz resonator in the closed system.

Respective one of the walls of the partition chamber 1, the first container 4 and the second container 6 may be made of a metal, an alloy, a resin, a plastic, a ceramic or the like, or may be made of heat insulation wall for vacuum condition. The partition plate 3 may be made as a plate of a metal, an alloy, a resin, a plastic, a ceramic or the like, which has thickness and elasticity corresponding to a frequency characteristic of the acoustic wave, so as to effectively propagate the acoustic wave outputted from the electromotive-type speaker 2 into the first container 4. More specifically, an acryl plate, which thickness is 1 millimeter, may be used as the partition plate 3. Moreover this partition plate 3 may be made of multi-layer film.

In particular, in this embodiment, the partition chamber 1 including the electromotive-type speaker 2 defines the sealed space which is completely sealed. Owing to this feature, the embodiment is constituted such that the liquid sample 7 does not directly come in contact with the electromotive-type speaker 2. The partition chamber 1 located behind the electromotive-type speaker 2, may be omitted if a surrounding atmosphere is except a vacuum atmosphere. Incidentally, in this case, the sealed space formed between the partition plate 3 and the electromotive-type speaker 2 preferably exists so that the partition plate 3 and the electromotive-type speaker 2 do not come in contact with each other. Conversely, if the surrounding atmosphere is the vacuum atmosphere, such as the space outside of the earth, for example, an output operation of the acoustic wave by the electromotive-type speaker 2 is appropriately performed inside of the partition chamber 1, because the electromotive-type speaker 2 is disposed in the sealed space which is sealed by the partition chamber 1 and in which a pressure is maintained in a appropriate pressure. Moreover, the embodiment is constituted such that it is possible to prevent fine particles from the surrounding atmosphere, for example, from adhering onto the electromotive-type speaker 2, because of the partition chamber 1.

Incidentally, as understood from FIG. 1, a microphone for the measurement is not provided, in the first embodiment.

In FIG. 2, the volume measuring apparatus is provided with: an amplifier for drive 8; a transmitting and receiving controller 9; an amplifier for measurement 10; and an operation device (i.e., an operator) 11. Incidentally explanation about a power source is omitted.

The amplifier for drive 8 is one example of "amplifier" associated with the present prevention, and drives the electromotive-type speaker 2 in constant current condition. The transmitting and receiving controller 9 perform a control to make the electromotive-type speaker 2 (i) transmit the acoustic wave and (ii) receive a voltage signal of a voice coil in the electromotive-type speaker 2. The amplifier for measurement 10 is an amplifier to measure a voltage of the voice coil in the electromotive-type speaker 2. The operation device 11 is one example of "calculating device", "first calculating device" and "second calculating device" associated with the present prevention, and includes CPU (Central Processing Unit) and the like. The operation device 11 is constituted to (i) obtain the Helmholtz resonance frequency associated with the Helmholtz resonator in the closed system, on the basis of the "voltage of the voice coil" which is generally in proportion to an impedance of the voice coil by driving the voice coil in the constant current condition. The Helmholtz resonator in the closed system here is provided with the neck-tube 5, the first container 4 and the second container 6. The operation device 11 is constituted to (ii) further calculate a volume of the fluid sample 7 from this obtained Helmholtz resonance frequency.

Subsequently, a principle and an operation of a volume measurement of the first embodiment will be discussed.

Upon measuring, a sweep wave of a frequency range is outputted by the transmitting and receiving controller 9. The frequency range includes the Helmholtz resonance frequency in the case that a signal time period is between dozens of millisecond and several seconds. The first container 4, the neck-tube 5 and the second container 6 are regarded as "resonator". On this occasion, the electromotive-type speaker 2 is driven in the constant current condition, by using the amplifier for drive 8.

Here, the external noise other than the acoustic signal is detected by the microphone as a result, if the microphone detects a response associated with "resonator" as described above, in particular, if the magnitude of the sound is reduced so as to restrain a generation of heat by the electromotive-type speaker 2. Therefore, finally, a degradation in the specifying accuracy of the Helmholtz resonance frequency, is caused.

However, in the embodiment, the amplifier for drive 8 drives the electromotive-type speaker 2 in the constant current condition. The transmitting and receiving controller 9 receives the voltage of the voice coil in the electromotive-type speaker 2, via the amplifier for measurement 10. At this time, the magnitude of the sound is not reduced so as to restrain a generation of heat by the electromotive-type speaker 2.

Subsequently the operation device 11 calculates a power spectrum by using the maximum entropy method (MEM), after receiving the voltage signal associated with the voice coil corresponding to the acoustic signal from the transmitting and receiving controller 9 as described above. Then a superiority frequency peak (or peak frequency) is determined. In this case, the operating device 11 can specify a peak of frequency (or peak frequency) on the power spectrum, by the resolution ability of frequency equal to or below 1 hertz, by virtue of the maximum entropy method, even if the signal time period is equal to or below several seconds. Then the volume of gaseous phase part of the second container 6 is determined by substituting this peak frequency for the Helmholtz resonance frequency in the following equation known in public.

$$f = (C/2\pi) \times [(A/L) \times \{(1i/V1) + (1/V2)\}]^{1/2}$$

wherein f: a Helmholtz resonance frequency of an acoustic signal
C: a speed of sound
A: a cross-sectional area size of an acoustic tube 5
L: an length of an acoustic tube 5
V1: an volume of gaseous phase part of the first container 4
V2: an volume of gaseous phase part of the second container 6

Here, the speed of sound C, the cross-sectional area size A of the acoustic tube 5, the length L of the acoustic tube 5 and the volume V1 of the first container 4 are known or are constant values. Therefore, a change of the volume V2 of gaseous phase part of the second container 6 results in to show up in the frequency f. Therefore, it is possible to calculate the volume V2 of gaseous phase part of the second container 6 on the basis of an analysis of the frequency f. Then, at last, it is possible to calculate the volume of the liquid sample 7 contained inside of the second container 6, because the whole volume of the second container 6 is known or is constant value.

The value of the volume measured as a result of the above may be displayed on a display panel (not illustrated in Figure), or may be recorded in a recording apparatus, such as a recorder for example, in a form to correspond to the kind of the liquid sample 7 or time.

Here, the resonance frequency falls, according to the theoretical formula, in a range between the resonance frequency and the reversed resonance frequency, if the space between the partition plate 3 and the electromotive-type speaker 2 is decreased in size so that the stiffness of this space is increased. However, a difference between the resonance frequency and the reversed resonance frequency is small, so both the resonance frequency and the reversed resonance frequency will change in the same manner versus the increase of the volume. According to an actual measurement, merely a convex shape of an impedance curve can be observed. According to the embodiment, constant members of the theoretical formula are cancelled based on the resonance frequency when the container is empty, in the case that the volume measurement is performed so as to measure the voltage of the voice coil being driven in the constant current condition. Therefore an error is not so much, even if the Helmholtz resonance frequency is regarded as the resonance frequency. So on this occasion, the measurement is performed on the basis of the formula in the constant current condition.

Therefore, it is possible to specify the volume V2, by definition, from the impedance of the voice coil of the electromotive-type speaker 2, which is corresponding to the Helmholtz resonance frequency, if an inductance value, a capacity value and a resistant value associated with each constitution elements except the second container 6 are provided as parameters. Herein, this Helmholtz resonance frequency is changeable depending on the volume V2 of gaseous phase part of the second container 6. Therefore, it is possible, by performing the constant current driving, to specify the volume V2, by definition, from the voltage of the voice coil measured, while the voltage of the voice coil, which is generally in proportion to an impedance of the voice coil by driving the voice coil in the constant current condition, is measured.

According to the first embodiment as described above, it is possible to obtain the volume V2 of gaseous phase part of the second container 6 from the Helmholtz resonance frequency obtained by measuring the voltage of the voice coil in an actual measurement, at a second step. This second step is performed after first steps of (i) obtaining the Helmholtz resonance frequency corresponding to each volumes of the liquid sample 7 contained in the second container 6 respectively, and then (ii) making these obtained values in a table format, or obtaining the relationship between each obtained volumes and each Helmholtz resonance frequency by virtue of approximation using a predetermined function or functions. Therefore, it is possible to specify, by definition, the volume of the liquid sample 7 contained in the second container 6, because the volume of the second container 6 is known.

Second Embodiment

Next, with reference in FIG. 3 to FIG. 5, a second embodiment of the volume measuring apparatus of the present invention will be discussed. The volume measuring apparatus in the second embodiment is the embodiment of the "second volume measuring apparatus" associated with the present invention, which is a measurement apparatus and whose type is the Helmholtz type in the opened system.

At first, with reference to FIG. 3, a structure of the second embodiment of the volume measuring apparatus of the present invention will be discussed. FIG. 3 shows an outline of a structure of a resonator part included in the volume measuring apparatus associated with the second embodiment. Incidentally, a figure of a block constitution of the whole of the volume measuring apparatus associated with the second embodiment, which includes the resonator part and the measurement device part will be omitted, because the part for the measurement other than the resonator part shown in FIG. 3 is same as the first embodiment shown in FIG. 2.

In FIG. 3, the volume measuring apparatus is provided with: a partition chamber 21; the electromotive-type speaker 22; a container 24 and a neck-tube 25 as the resonator part.

The partition chamber 21 defines a sealed space at the inside thereof. The electromotive-type speaker 22 is disposed in this sealed space. The partition chamber 21 includes a partition plate 23. The acoustic wave output surface of the electromotive-type speaker 22 (which is a front plane placed at the lower side in FIG. 3) is disposed opposite to the partition plate 23.

The container 24 is one example of "container" associated with the second volume measuring apparatus of the present prevention. The partition chamber 21 is disposed adjacent to the container 24. A liquid sample 27, which is one example of "object to be measured" associated with the present prevention, is contained in the container 24. The neck-tube 25 is one example of "acoustic tube" associated with the present prevention, and is for communication between the inner space of the container 24 and the surrounding atmosphere. So, the container 24 and the neck-tube 25 constitute a Helmholtz resonator in the opened system.

In particular, in this embodiment, the partition chamber 21 including the electromotive-type speaker 22 defines the sealed space which is completely sealed. Owing to this feature, the embodiment is constituted such that the liquid sample 27 does not directly come in contact with the electromotive-type speaker 22. The output operation of the acoustic wave of the electromotive-type speaker 22 is preferably performed in the partition chamber 21 since the electromotive-type speaker 22 is disposed in the sealed space, which is completely sealed by the partition chamber 21 and in which the pressure is properly maintained. Moreover, the embodiment is constituted such that it is possible to prevent fine particles from the surrounding atmosphere, for example, from adhering onto the electromotive-type speaker 22, by virtue of the partition chamber 21. Furthermore, the embodiment is constituted such that it is possible to prevent fine particles from the liquid sample 27 or via the neck-tube 25, for example, from adhering onto the acoustic wave output surface of the electromotive-type speaker 22, by virtue of the partition plate 23.

As understood from FIG. 3, a microphone for the measurement is not provided, in the second embodiment.

Subsequently, as shown in FIG. 4 and FIG. 5, a principle and an operation of a volume measurement of the second embodiment will be discussed. FIG. 4 shows a structure of an equivalent circuit including the electromotive-type speaker 22 and the partition plate 23, from a view point of the vibrating plate which is as a speaker cone associated with an acoustic system in the opened system. FIG. 5 shows a relationship between a frequency of the acoustic signal and a speed of the vibrating plate in the electromotive-type speaker, associated with the second embodiment.

As shown in FIG. 4, in the equivalent circuit from a view point of the vibrating plate which is as a speaker cone in the "Helmholtz resonator" associated with the second embodiment, the following six elements are connected with a power source or the vibrating source as illustrated in the figure. Namely, the six elements are (i) an equivalent machinery (or mechanical) mass of the vibrating plate Msp, an equivalent machinery resistance of the vibrating plate Rsp and an equivalent machinery stiffness of the vibrating plate Ssp, (ii) an equivalent machinery resistance of a rear side cave part Rbk and an equivalent machinery stiffness of a rear side cave part Sbk, (iii) an equivalent machinery resistance of a resonator cave part Rca and an equivalent machinery stiffness of a resonator cave part Sca, (iv) an equivalent machinery mass of a tube part Mpo and an equivalent machinery resistance of a tube part Rpo, (v) an equivalent machinery resistance of the partition plate—the vibrating plate cave part Rme and an equivalent machinery stiffness of the partition plate—the vibrating plate cave part Sme, and (iv) an equivalent machinery mass of the partition plate Mwl, an equivalent machinery resistance of the partition plate Rwl and an equivalent machinery stiffness of the partition plate Swl.

FIG. 5 shows one example of a relationship between a frequency of the acoustic signal which causes the Helmholtz resonance and a speed of the vibrating plate in the electromotive-type speaker 22, in the volume measuring apparatus associated with the second embodiment. As shown in FIG. 5, a peak value is clearly appeared at a resonance point and a reversed resonance point respectively corresponding to the Helmholtz resonance frequency in an acoustic system in the opened system associated with the second embodiment. Therefore it is possible to specify (or specify for choosing) the Helmholtz resonance frequency, as a peak of the frequency in the voltage signal spectrum measured, after measuring the voltage of the voice coil which is generally in proportion to an impedance of the voice coil.

According to the second embodiment as described above, it is possible to obtain the volume of gaseous phase part of the container 24 from the Helmholtz resonance frequency obtained by measuring the voltage of the voice coil in an actual measurement, at a second step. This second step is performed after first steps of (i) obtaining the Helmholtz resonance frequency corresponding to each volumes of the liquid sample 27 contained in the container 24 respectively, and then (ii) making these obtained values in a table format, or obtaining the relationship between each obtained volumes and each Helmholtz resonance frequency by virtue of approximation using a predetermined function. Therefore, it is possible to specify, by definition, the volume of the liquid sample 27 contained in the container 24, because the volume of the container 24 is known.

Third Embodiment

Next, with reference in FIG. 6, a third embodiment of the volume measuring apparatus of the present invention will be discussed. The volume measuring apparatus in the third embodiment is the embodiment of the "third volume measuring apparatus" associated with the present invention, which is a measurement apparatus and whose type is the Helmholtz type in the opened system. FIG. 6 shows an outline of a structure of the resonator part included in the volume measuring apparatus associated with the third embodiment. Incidentally, a figure of a block constitution of the whole of the volume measuring apparatus associated with the third embodiment, which includes the resonator part and the measurement device part will be omitted, because the part for the measurement other than the resonator part shown in FIG. 6 is same as the first embodiment shown in FIG. 2.

In FIG. 6, the volume measuring apparatus is provided with: a partition chamber 31; the electromotive-type speaker 32; a container 34, a neck-tube 35in, a neck-tube 35out and a carrying belt 36 as the resonator part.

The partition chamber 31 defines a sealed space at the inside thereof. The electromotive-type speaker 32 is disposed in this sealed space. The partition chamber 31 includes a partition plate 33. The acoustic wave output surface of the electromotive-type speaker 32 (which is a front plane placed at the lower side in FIG. 6) is disposed opposite to the partition plate 33.

The container 34 is one example of the "container" associated with the third volume measuring apparatus of the present prevention. The partition chamber 31 is disposed adjacent to the container 34. A solid sample 37, which is one example of "object to be measured" associated with the present prevention, is contained in the container 34. The neck-tube 35in is one example of "acoustic tube for carrying into" associated with the present prevention. The neck-tube 35out is one example of "acoustic tube for carrying out" associated with the present prevention. The neck-tube 35in and the neck-tube 35out are for communication between the inner space of the container 34 and the surrounding atmosphere. So, the container 34, the neck-tube 35in and the neck-tube 35out constitute a Helmholtz resonator in the opened system.

The carrying belt 36 is one example of the "carrying device" associated with the present prevention, and is constituted such that the carrying belt 36 carry the solid sample 37 into the container 34 via the neck-tube 35in, and that the carrying belt 36 further carry the solid sample 37 out of the container 34 via the neck-tube 35out. The measurement of the volume is performed when the carried solid sample 37, as described above, arrived at a center of the container 34. Incidentally, the carrying belt 36 may stop its carrying operation when the carried solid sample 37, as described above, arrived at a center of the container 34. Alternatively, the carrying belt 36 may not stop its carrying operation as long as the measurement of the volume can be performed in sufficient accuracy.

In particular, in this embodiment, the partition chamber 31 including the electromotive-type speaker 32 defines the sealed space which is completely sealed. Owing to this feature, the embodiment is constituted such that the solid sample 37 does not directly come in contact with the electromotive-type speaker 32. The output operation of the acoustic wave of the electromotive-type speaker 32 is preferably performed in the partition chamber 31 since the electromotive-type speaker 32 is disposed in the sealed space, which is completely sealed by the partition chamber 31 and in which the pressure is properly maintained. Moreover, the embodiment is constituted such that it is possible to prevent fine particles from the surrounding atmosphere, for example, from adhering onto the electromotive-type speaker 32, by virtue of the partition chamber 31. Furthermore, the embodiment is constituted such that it is possible to prevent fine particles from the solid sample 37 or via the neck-tube 35in and 35out, for example, from adhering to acoustic onto the wave output surface of the electromotive-type speaker 32, by virtue of the partition plate 33.

As understood from FIG. 6, a microphone for a measurement is not provided, in the third embodiment.

Forth Embodiment

Next, with reference in FIG. 7, a forth embodiment of the volume measuring apparatus of the present invention will be discussed. The volume measuring apparatus in the forth embodiment is a modified embodiment of the first volume measuring apparatus associated with the present invention as described above, which is a measurement apparatus whose type is the Helmholtz type in the closed system. FIG. 7 shows an outline of a structure of a resonator part included in the volume measuring apparatus associated with the forth embodiment. Incidentally, a figure of a block constitution of the whole of the volume measuring apparatus associated with the forth embodiment, which includes the resonator part and the measurement device part, will be omitted, because the part for the measurement other than the resonator part shown in FIG. 7 is same as the first embodiment shown in FIG. 2. Moreover, in FIG. 7, the constitutional elements of the forth embodiment which are the same as those in the first embodiment shown in FIG. 1, carry the same reference numerals and the explanations thereof are appropriately omitted.

In FIG. 7, the volume measuring apparatus is provided with: a partition chamber 1; the electromotive-type speaker 2; a container 4; a neck-tube 5; a container 6; a mixer 42; and a magnetic stirrer 43, as the resonator part.

The mixer 42 and the magnetic stirrer 43 are one example of the "separating device" associated with the present prevention. The magnetic stirrer 43 is constituted to rotate the mixer 42 by magnetic force. The liquid sample 7 is separated from the gaseous phase part in the container 6 by virtue of the inertia force, for example, as the liquid sample 7 is being mixed by the mixer 42. Therefore, it is possible to perform the Helmholtz type measurement even in such a condition that there is no gravity or there is minute gravity, such as space outside of the earth.

Incidentally, as understood from FIG. 6, a microphone for the measurement is not provided, in the forth embodiment. The magnetic stirrer 43 generates noise or vibration except the acoustic signal in the container 6 on its operation. Therefore, obtaining the acoustic signal on the basis of the measurement of the impedance of the voice coil in the electromotive-type speaker 2 is more advantageous than obtaining the acoustic signal by using the microphone. This is because a harmful effect which is the noise or vibration from the magnetic stirrer 43, can be eliminated.

Incidentally, a rotation element may be provided, in addition to the mixer 42 as described above, into the container 6, as a dynamic separating device. Alternatively, a groove or grooves may be provided, at the inside of the wall of the container 6, as a static separating device. For example, porous materials e.g., mesh, steal wool, sponge and wick, may be stuck on the wall of the container 6, as the separating device. Furthermore, it is possible to use these dividing devices in combination.

Fifth Embodiment

Next, with reference in FIG. 8, a fifth embodiment of the volume measuring apparatus of the present invention will be discussed. The volume measuring apparatus in the fifth embodiment is a modified embodiment of the forth volume measuring apparatus associated with the present invention as described above, which is a measurement apparatus and whose type is the Helmholtz type in the closed system. FIG. 8 shows an outline of a structure of a resonator part included in the volume measuring apparatus associated with the fifth embodiment. Incidentally, a figure of a block constitution of the whole of the volume measuring apparatus associated with the fifth embodiment, which includes the resonator part and the measurement device part, will be omitted, because the part for the measurement other than the resonator part shown in FIG. 8 is same as the first embodiment shown in FIG. 2. Moreover, in FIG. 8, the constitutional elements of the fifth embodiment which are the same as those in the first and fourth embodiments shown in FIG. 1 and FIG. 7, carry the same reference numerals and the explanations thereof are appropriately omitted.

In FIG. 8, the volume measuring apparatus is provided with: a partition chamber 1; the electromotive-type speaker 2; a container 4; a neck-tube 5; a container 6; a mixer 42; and a magnetic stirrer 43, as the resonator part, and is further provided with a microphone 51.

The microphone 51 is constituted to receive an acoustic wave outputted into the container 6 from the electromotive-type speaker 2.

Incidentally, the magnetic stirrer 43 generates noise or vibration except the acoustic signal in the container 6 on its operation. Therefore, obtaining the acoustic signal on the basis of the measurement of the impedance of the voice coil in the electromotive-type speaker 2, associated with the forth embodiment, is more advantageous than obtaining the acoustic signal by using the microphone, associated with the fourth embodiment. This is because a harmful effect which is the noise or vibration from the magnetic stirrer 43, can be eliminated.

In addition, the microphone 51 associated with the fifth embodiment may be added to the first to forth embodiments shown in FIG. 1 to FIG. 7. Even if the microphone 51 is employed, various advantages can be accordingly obtained to some extent since the electromotive-type speaker 22 is disposed in this sealed space defined by the partition chamber 21.

Next, with reference in FIG. 9 to FIG. 11, how to obtain the relatively high Signal to Noise Ratio associated with the forth embodiment, will be discussed. The forth embodiment, in which the acoustic signal is indirectly detected based on the measurement of the impedance of the voice coil, can be performed with higher Signal to Noise Ratio, as compared with the fifth embodiment, in which the acoustic signal is directly detected by using the microphone. Here, FIG. 9 shows a result of a noise experiment associated with the fifth embodiment, wherein FIG. 9(a) shows about a case in which the noise is absent and FIG. 9(b) shows about a case in which the noise is present. FIG. 10 shows a result of a noise experiment associated with the fourth embodiment, wherein FIG. 10(a) shows about a case in which the noise is absent and FIG. 10(b) shows about a case in which the noise is present. Moreover, FIG. 11 shows a variable coefficient of the resonance frequency specified (or specified for choosing) when the Helmholtz resonance frequency is measured by one hundred times under the same condition.

On the fifth embodiment, the noise or vibration except the acoustic signal is generated at the inside of the Helmholtz resonator constituted of the container 6 and the like, by operating the magnetic stirrer 43 in the condition that nothing is put into the second container 6, except for the mixer 42. If a signal sound, whose frequency is 200 Hertz as shown in FIG. 9(a) is generated by the electromotive-type speaker 2, the response signal (the acoustic signal) as shown in FIG. 9(b) is detected by the microphone 51 under the condition in which a noise is absent and a noise generated by the mixer 42 is present. That is to say, the noise except the 200 Hertz of the signal is overlapped on the detected signal of the 200 Hertz detected by the microphone 51 in the case that the mixer 42 is rotated. On the fifth embodiment, described above, the noise is taken by the microphone 51 as shown in FIG. 9(b), if the external noise or the noise caused by the mixer 42 is generated. Therefore, the Signal to Noise Ratio on the response signal (the acoustic signal) is degraded. That is to say, the fifth embodiment is advantageous in the case that a level of required Signal to Noise Ratio is low.

On the contrary, on the fourth embodiment, if a response signal (i.e., an acoustic signal), whose frequency is 200 Hertz, is generated by the electromotive-type speaker 2 as shown in FIG. 10(a) under the same condition, the noise except the 200 Hertz of the signal or another noise is hardly overlapped on the detected signal of the 200 Hertz as shown in FIG. 10(b), in the case of the voltage of the voice coil of the electromotive-type speaker 2 measuring by using the amplifier for drive 8 shown in FIG. 2. On the fourth embodiment, described above, an ingredient shown as the noise is hardly contained in the response signal (the acoustic signal) indirectly obtained by the measurement of the voltage of the voice coil, even if the external noise or the noise caused by the mixer 42 is generated. So, the Signal to Noise Ratio on the response signal (the acoustic signal) associated with the voice coil of the electromotive-type speaker 2 is maintained in relatively high level without depending on the noise. That is to say, the fourth embodiment is advantageous in the case that the mixer 42 is used, a level of the external noise is high and a level of required Signal to Noise Ratio is high.

For example, the variable coefficient of the resonance frequency specified (or specified for choosing) is obtained as shown in FIG. 11, if the Helmholtz resonance frequency is measured by one hundred times under the same condition, for example. Incidentally, the "variable coefficient [%]" shown in the Table 1 of the FIG. 11 indicates a percentage of a standard deviation for the mean value. The variable coefficient becomes more than 100 times in the noise condition, as compared with a non-noise condition, in case that the microphone 51 is used associated with the fifth embodiment, or or in case that the microphone 51 is used associated with the first to the sixth patent documents. On the contrary, the variable coefficients are substantially equalized between in the noise condition and in the non-noise condition, in case that the amplifier for drive 8 which drives the electromotive-type speaker in the constant current condition, is employed as in the forth embodiment in addition to the first to third embodiment (refer to right column of the Table 1).

As explained with referring to FIG. 9 to FIG. 11, the embodiment, which does not use the microphone to detect the acoustic signal, is greatly advantageous, in such an environment of (i) the dynamic separating device e.g., the mixer or the rotation element, to separate the sample from the gaseous phase part is employed, (ii) the noise occurs in carrying the sample, or (iii) the external noise is big around the surrounding atmosphere. An improvement in the Signal to Noise Ratio can be expected, because an effect onto the impedance of the voice coil caused by the external noise is smaller than an effect onto the microphone caused by the external noise.

Therefore, the first to the forth embodiments are extremely superior for enduring against the noise.

Other Modified Embodiment

According to the first to fifth embodiments, the partition plate is disposed in front of the electromotive-type speaker 2. However, various advantages can be still obtained to some extent, as long as the microphone is not used, as other embodiment even if the partition plate is removed. In this case, the peak shape of the signal spectrum of the voltage of the voice coil measured is not convex for the upper side thereof but convex for the lower side thereof. It is possible to specify (or specify for choosing) the Helmholtz resonance frequency, as this peak of frequency, which shape is convex for the lower side. That is to say, it is possible to measure the volume based on the measurement of the voltage of the voice coil while driving the electromotive-type speaker in the constant current condition, even if the partition plate is not provided (although the effect by the partition plate is lost). This modified embodiment may correspond to each of the forth to the sixth embodiments, as described above. For example, in the case not to use the partition plate 23 as the modified embodiment of the second embodiment, it is possible to obtain the volume of gaseous phase part of the container 24 from the reversed resonance frequency obtained by measuring the voltage of the voice coil in an actual measurement, at a second step. This second step is performed after first steps of (i) obtaining the reversed resonance frequency (i.e., dip) corresponding to each volumes of the liquid sample 27 contained in the container 24 respectively, and then (ii) making these obtained values the table form or obtaining the relationship between each obtained volumes and each reversed resonance frequency by approximating by use of the predetermined function. Therefore, it is possible to specify, by definition, the volume of the liquid sample 27 contained in the container 24, because the volume of the container 24 is known.

According to the embodiments, as explained above, it is possible to measure the volume of the object to be measured in the container in the closed and opened systems, without using a detecting device e.g. microphone, on the basis of the analysis and the measurement of the voltage signal of the voice coil which is included in the electromotive-type speaker driven by the amplifier in the constant current condition. Owing to this feature, there is no need to use the microphone which has a possibility of damage by contacting of the object to be measured, such as liquid, for example. Therefore, in particular, it is possible to measure the volume of the liquid, even if the object to be measured is floating in the non-gravity environment, such as, space outside of the earth. Furthermore, the measurement without using the microphone is less or hardly affected by the influence of the external noise, as compared with the measurement with using the microphone. This is because a loss in the changing part where the noise, such as the external noise other than the acoustic signal, is changed into the mechanical system of the electromotive-type speaker, is greater in the measurement without using the microphone than in the measurement using the microphone. Furthermore, in addition to this effect, it is possible to reduce the amount of heat generated of the speaker while restraining an electric power at the lower side as compared with the conventional method, because of the improvement in enduring against the noise in the measurement system. Therefore, it is possible to improve the degree of safety in measuring the volume of the substance which has a possibility of burning and exploding. Alternatively, in addition to this effect, it is possible to easily introduce the measurement apparatus to a general manufacturing field, because the measurement apparatus is made of cheaper parts, and because the life time of the measurement apparatus becomes longer based on the structure in which the speaker does not contact with the object to be measured.

In particular, according to the first embodiment, it is considered that the measurement may be applied to the understanding of remained amount of the liquid in a fuel tank, which is necessary for a conception of a fuel space station in which the fuel is supplied to the OTV (Orbit Transfer Vehicle) in an orbit around earth or moon and an orbit around a planet, for example.

Alternatively, according to the second or the third embodiment, it is possible to measure the volume under such an environment that the noise level is relatively higher, such as a factory. It is also useful in the case that the external noise directly enters into the inside of the container, such as the container in the opened system. Therefore, it is possible to apply a continuous measurement of the volume of products on a belt conveyer. The huge spread effect, which includes a merit about an introducing cost to existing facility, can be expected. For example, various uses, such as (i) a measuring apparatus to measure the volume of products in food factory or selecting factory of fruits, (ii) a monitor for over-run during manufacturing process of bubble food, e.g. whip cream (iii) expansion monitor of dough in a factory for manufacturing bread or confectionary and (iv) an estimation apparatus for measuring the degree of burning, for example, can be considered.

The present invention is not limited to the above-described embodiments, and various changes may be made, if desired, without departing from the essence or spirit of the invention which can be read from the claims and the entire specification. A volume measuring apparatus which involves such change, is also intended to be within the technical scope of the present invention.

(Measurement of Impedance of Coil and Equivalent Circuit)

Next, with reference to FIG. 12 and FIG. 13, theoretical support of the resonance frequency specified or specified for choosing will be discussed by use of the equivalent circuit.

The microphone is generally used for detecting a responding acoustic wave with respect to an inputted acoustic wave. It is necessary to expose the microphone to the inside of a fuel container because the microphone cannot be located outside of the container in the case of the container in the closed system. Since a damage of the microphone may be caused by a contact with the liquid fuel, some countermeasure to prevent this is necessary. However, it is hardly or not possible to perfectly cut off the contact unless the container is sealed. Therefore, the resonance frequency is specified (or specified for choosing) by detecting a change of an impedance of the voice coil in a speaker at the input side, without providing the microphone.

A vibration of a speaker cone is a vibration in machinery system, and this vibration becomes a sound, when this vibration is changed into the vibration in acoustic system. In the case that the resonator is provided with a partition plate, the vibration in the machinery system of the speaker cone is affected by an acoustic pressure of the inside of the resonator in resonance, via the partition plate and a sealed space. The vibration in the electrical system of the voice coil is affected by the vibration in the machinery system of the speaker cone. The sealed space may mean a space between the speaker cone and the partition plate.

An electrical impedance of the voice coil is combination of an impedance as a static characteristic of the voice coil and an impedance as a dynamic characteristic corresponding to a movement of the voice coil. The electrical impedance reflects a speed of the voice coil. In resonance, since the speed of the voice coil becomes its local maximum or minimum, the resonance frequency is believed to be estimated on the basis of the impedance curve.

FIG. 12 shows an electrical estimation circuit obtained by replacing (i) the vibrations in the machinery system and the acoustic system based on the speaker cone i.e., vibrating plate, with (ii) the vibration in the machinery system, on an assumption that a wave length in resonance is lager than a size of the resonator and can be approximated by a concentration constant system.

In FIG. 12, if a driving force of the equivalent circuit is constant, an equivalent machinery impedance is expressed by the next formula in considering a load from speaker cone 2a which is the vibrating plate.

The following formula become true, if a practical effect values of the driving force and the speed of the vibrating plate are respectively F and V.

$$V = \frac{F}{|\dot{Z}_m|} \quad \text{[Formula 2]}$$

The resistances of the gaseous phase part in the acoustic system Rbk, Rmd, Rpo, Rc1, Rc2 are so small to be ignored, and the following formula $$\{(Sc1+Sc2)/Mpo\}^{1/2} << [\{(Ssp+Sbk+Swl)+Smd\}/(Msp+Mwl)]^{1/2}$$

is true, that is to say, Smd is taken as big while a space between the speaker cone and the partition plate is small $$\dot{Z}_m = \left[ (R_{sp} + R_{bk} + R_{md} + R_{wl}) + \frac{R_{c1}(R_{po} + R_{c2})(R_{c1} + R_{po} + R_{c2}) + \left(S_{c1}M_{po} - \frac{S_{c1}S_{c2}}{\omega^2}\right)\left(M_{po}\omega - \frac{S_{c1}}{\omega} - \frac{S_{c2}}{\omega}\right)}{(R_{po} + R_{c1} + R_{c2})^2 + \left(M_{po}\omega - \frac{S_{c1}}{\omega} - \frac{S_{c2}}{\omega}\right)^2} \right] + \left[ \left(M_{sp}\omega - \frac{S_{sp}}{\omega} - \frac{S_{bk}}{\omega} - \frac{S_{md}}{\omega} + M_{wl}\omega - \frac{S_{wl}}{\omega}\right) + \frac{\left(S_{c1}M_{po} - \frac{S_{c1}C_{c2}}{\omega^2}\right)(R_{po} + R_{c1} + R_{c2}) - R_{c1}(R_{po} + R_{c2})\left(M_{po}\omega - \frac{S_{c1}}{\omega} - \frac{S_{c2}}{\omega}\right)}{(R_{po} + R_{c1} + R_{c2})^2\left(M_{po}\omega - \frac{S_{c1}}{\omega} - \frac{S_{c2}}{\omega}\right)^2} \right] j \quad \text{[Formula 1]}$$

Herein,

Msp: an equivalent machinery mass of the vibrating plate (the speaker cone)

Rsp: an equivalent machinery resistance of the vibrating plate

Ssp: an equivalent machinery stiffness of the vibrating plate

Rbk: an equivalent machinery resistance of a rear side cave part of the speaker

Sbk: an equivalent machinery stiffness of a rear side cave part of the speaker

Rmd: an equivalent machinery resistance of a cave part between the speaker cone (vibrating plate) and the partition plate Smd: an equivalent machinery stiffness of a cave part between the speaker cone (vibrating plate) and the partition plate Mwl: an equivalent machinery mass of the partition plate Rwl: an equivalent machinery resistance of the partition plate Swl: an equivalent machinery stiffness of the partition plate Rc1: an equivalent machinery resistance of a cave part of the first container Sc1: an equivalent machinery stiffness of a cave part of the first container Rc2: an equivalent machinery resistance of a cave part of the second container Sc2: an equivalent machinery stiffness of a cave part of the second container Mpo: an equivalent machinery mass of a tube part Rpo: an equivalent machinery resistance of a tube part enough with respect to the first container 4 and the second container 6. In this case, the speed of the vibrating plate becomes its locally maximum at the $\omega = \{(Sc1+Sc2)/Mpo\}^{1/2}$ calculated from the Formula (1) and the Formula (2).

Sc1, Sc2 and Mpo are respectively expressed as $$Sc1 = \gamma \times P_0 \times A^2/V1,$$

$$Sc2 = \gamma \times P_0 \times A^2/V2 \text{ and}$$

$$Mpo = \rho \times A \times L,$$

when the Helmholtz resonance system is assumed to be a vibration system with one free degree, which is provided with a gaseous pillar mass in the neck tube and air spring of the cave of the container. By putting these expressed values into the formula of $\omega$, and putting them in order by using a sound (acoustic) speed formula of gaseous, $c = (\gamma \times P0/\rho)^{1/2}$, the local maximum point frequency f0 can be expressed as the following formula.

$$f0 = (C/2\pi) \times [(A/L) \times \{(1/V1) + (1/V2)\}]^{1/2} \quad (3)$$

wherein $\gamma$: a ratio of specific heat of an air $\rho$: a density of the air P0: a pressure of the air C: a speed of sound in the air V1: a volume of the first container in the resonator in the closed system V2: a volume of the second container in the resonator in the closed system A: an area size in section of a neck tube of the resonator in the closed system L: a length of a neck tube of the resonator in the closed system Formula (3) coincides with the Helmholtz resonance formula in the container in the closed system, which is introduced by the inventor of the present invention. FIG. 13 shows the result of a calculation of a frequency characteristic of the speed of the vibration plate, in the case that the fluid is put in the second container 6 by respective one of the ratios 0%, 10% and 20% versus a capacity of the second container 6, on the basis of the formulas (1) and (2). In this case, as for the parameters of the equivalent circuit element, the values, which can be estimated from a physical value of the air and a size of the resonator shown in FIG. 1, are employed while arbitrary values are given for the values except these estimated values. One resonance frequency point is appeared on a base line which right side is relatively upward. Apart from that, the values of the resonance frequency calculated from the formula (3) are 201.62 Hz, 204.95 Hz and 209.04 Hz respectively. So the resonance frequency calculated from the formula (3) coincides with the resonance frequency in FIG. 13.

The value of the Helmholtz resonance frequency increases, if there is an object in a cave part of the resonance frequency device. This is because, an acoustic capacity of the air in the cave part except a volume of the object decreases. Namely, the equivalent machinery stiffness of a cave part of the second container Sc2 (in the case that the object is put into the second container 6) increases. The cave part may mean empty part except a volume of the object. According to the FIG. 13, it can be confirmed that the local maximum point frequency increases, as the value of the equivalent machinery stiffness of a cave part of the second container Sc2 increases, in the same manner as the Helmholtz resonance frequency. The electrical impedance increases, as the speed of the voice coil increases. Therefore, it is concluded that, by measuring the frequency response of the electrical impedance, the resonance frequency can be estimated from the local maximum point frequency thereof.

In the real measurement, the resonance frequency is specified or specified for choosing, after estimating the spectrum on the basis of the response signal for white noise or pulling or sweeping signal. In this case, FFT (Fast Fourier Transform Method) may be used for the estimation of the spectrum. It is possible to perform a real time processing even if it is combined in the measurement system, because FFT is very fast processing. However, if FFT is used, the frequency resolution ability is reduced if a data length becomes short. Thus, a shorting of time period for adding the signal for the purpose of preventing the heat generation causes a reduction of an estimation accuracy of the volume calculated from the frequency.

Therefore, in this prevention, the MEM (Maximum Entropy Method) may be used which can estimate the spectrum in high resolution ability even from the short data, in stead of the FFT. In general, the speaker is driven in the constant voltage, so the measurement of the electrical impedance is performed by the measurement of the current of the coil. In this case, an output value becomes the local minimum at the frequency at which the local maximum value appears on the curve of the electrical impedance. This is because the output value is reversely proportional to the electrical impedance. However, it is difficult to adapt the MEM for the estimation of the local minimum point. Thus, the output, which is proportional to the change of the electrical impedance, is taken, by measuring the voltage between the voice coil while driving the speaker in the constant current,

INDUSTRIAL APPLICABILITY

The volume measuring apparatus and method of the present invention can be applied to measure a volume of an object in a container in a sealed system (a closed system) or in an opened system in a product line associated with the space environment technique or production line. Furthermore, the volume measuring apparatus and method of the present invention can be applied to measure the remaining fuel amount in a tank of liquid Hydrogen of a fuel battery vehicle. Alternatively, the volume measuring apparatus and method of the present invention can be applied to measure the liquid Hydrogen in a fuel tank, if the hydrogen is used for other than the vehicle, as a clean energy.

The invention claimed is:

1. A volume measuring apparatus comprising:
   an acoustic tube whose one end is communicated with a container in which an object to be measured is contained;
   another container communicated with the other end of said acoustic tube;
   a partition chamber which defines a sealed space disposed adjacent to said another container and which includes a partition plate for dividing the sealed space and an inner space of said another container;
   an electromotive-type speaker which is disposed in the sealed space and whose acoustic wave output surface is disposed opposite to the partition plate; and
   a processing device for obtaining a volume of the object to be measured, on the basis of an acoustic signal associated with an acoustic wave outputted into said another container via the partition plate from the acoustic wave output surface.

2. The volume measuring apparatus according to claim 1, further comprising: a microphone for receiving the acoustic wave, wherein
   said processing device obtains the volume of the object to be measured, on the basis of the acoustic signal associated with an acoustic wave received by said microphone.

3. The volume measuring apparatus according to claim 1, wherein
   the object to be measured is fluid, and
   said volume measuring apparatus further comprises: a separating device for separating the fluid from gaseous phase in a non or minute gravity condition.

4. The volume measuring apparatus according to claim 1, further comprising: an amplifier, whose type is constant current driving type, for driving said electromotive-type speaker, wherein
   said processing device includes (i) a measuring device for measuring a voltage of a voice coil associated with said electromotive-type speaker and (ii) a calculating device for calculating the volume of the object to be measured, on the basis of the measured voltage.

5. The volume measuring apparatus according to claim 4, wherein
   the calculating device includes (i) a first calculating device for performing a frequency analysis associated with the acoustic signal, on the basis of the measured voltage and (ii) a second calculating device for calculating the volume of the object to be measured, on the basis of a result of the performed frequency analysis.

6. The volume measuring apparatus according to claim 5, wherein
the first calculating device determines a resonance frequency associated with the acoustic signal, as a frequency giving a peak in a spectrum of the measured voltage, and
the second calculating device calculates the volume, on the basis of the determined resonance frequency.

7. The volume measuring apparatus according to claim 6, wherein
said container contains the object to be measured in an extremely low temperature condition,
an amplifier drives said electromotive-type speaker in constant current condition so as to perform a maximum entropy method□MEM□ for a sufficient time period period, and
the first calculating device determines the resonance frequency by the maximum entropy method.

8. A volume measuring apparatus comprising:
an acoustic tube whose one end is communicated with a container in which an object to be measured is contained;
another container communicated with the other end of said acoustic tube;
an electromotive-type speaker whose acoustic wave output surface is disposed facing an inner space of said another container;
an amplifier, whose type is constant current driving type, for driving said electromotive-type speaker;
a measuring device for measuring a voltage of a voice coil associated with said electromotive-type speaker; and
a calculating device for calculating a volume of the object to be measured, on the basis of the measured voltage.

9. A volume measuring method on a volume measuring apparatus comprising: an acoustic tube whose one end is communicated with a container in which an object to be measured is contained; another container communicated with the other end of said acoustic tube; a partition chamber which defines a sealed space disposed adjacent to said another container and which includes a partition plate for dividing the sealed space and an inner space of said another container; and an electromotive-type speaker which is disposed in the sealed space and whose acoustic wave output surface is disposed opposite to the partition plate,
said volume measuring method comprising:
an outputting process of outputting an acoustic wave into said another container via the partition plate from the acoustic wave output surface; and
a processing process of obtaining a volume of the object to be measured, on the basis of an acoustic signal associated with the outputted acoustic wave.

10. A volume measuring method on a volume measuring apparatus comprising: an acoustic tube whose one end is communicated with a container in which an object to be measured is contained; another container communicated with the other end of said acoustic tube; an electromotive-type speaker whose acoustic wave output surface is disposed facing an inner space of said another container; and an amplifier, whose type is constant current driving type, for driving said electromotive-type speaker,
said volume measuring method comprising:
a measuring process of measuring a voltage of a voice coil associated with said electromotive-type speaker; and
a calculating process of calculating a volume of the object to be measured, on the basis of the measured voltage.

* * * * *